US012057989B1

(12) United States Patent
Adl et al.

(10) Patent No.: US 12,057,989 B1
(45) Date of Patent: Aug. 6, 2024

(54) ULTRA-WIDE INSTANTANEOUS BANDWIDTH COMPLEX NEUROMORPHIC ADAPTIVE CORE PROCESSOR

(71) Applicant: HRL Laboratories, LLC, Malibu, CA (US)

(72) Inventors: Sanaz Adl, Thousand Oaks, CA (US); Peter Petre, Oak Park, CA (US); Adour V. Kabakian, Monterey Park, CA (US); Bryan H. Fong, Los Angeles, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 256 days.

(21) Appl. No.: 17/579,871

(22) Filed: Jan. 20, 2022

Related U.S. Application Data

(63) Continuation-in-part of application No. 17/375,724, filed on Jul. 14, 2021, now Pat. No. 11,863,221.
(Continued)

(51) Int. Cl.
   *H04L 27/38* (2006.01)
(52) U.S. Cl.
   CPC .................................... *H04L 27/38* (2013.01)
(58) Field of Classification Search
   CPC ...... H04L 27/38; G06F 2218/04; G06N 3/084
   See application file for complete search history.

(56) References Cited

U.S. PATENT DOCUMENTS 5,694,474 A * 12/1997 Ngo .................. H03H 21/0012
                                                    381/94.1

5,768,474 A * 6/1998 Neti .................... G10L 15/02
                                                    704/235
(Continued)

FOREIGN PATENT DOCUMENTS

CA    2977126 A1 *  2/2018  ................ G06N 3/08
CN    1582385 A  *  2/2005  ............ D06F 39/003
(Continued)

OTHER PUBLICATIONS

Childers, R. Varga and N. Perry, "Composite signal decomposition," in IEEE Transactions on Audio and Electroacoustics, vol. 18, No. 4, pp. 471-477, Dec. 1970, doi: 10.1109/TAU. 1970.1162135. (Year: 1970).*

(Continued)

*Primary Examiner* — Berhanu Tadese
(74) *Attorney, Agent, or Firm* — TOPE-MCKAY & ASSOCIATES

(57) ABSTRACT

Described is a system for Neuromorphic Adaptive Core (NeurACore) signal processor for ultra-wide instantaneous bandwidth denoising of a noisy signal. The NeurACore signal processor includes a digital signal pre-processing unit for performing cascaded decomposition of a wideband complex valued In-phase and Quadrature-phase (I/Q) input signal in real time. The wideband complex valued I/Q input signal is decomposed into I and Q sub-channels. The NeurACore signal processor further includes a NeurACore and local learning layers for performing high-dimensional projection of the wideband complex valued I/Q input signal into a high-dimensional state space; a global learning layer for performing a gradient descent online learning algorithm; and a neural combiner for combining outputs of the global learning layer to compute signal predictions corresponding to the wideband complex valued I/Q input signal.

16 Claims, 16 Drawing Sheets

Related U.S. Application Data

(60) Provisional application No. 63/150,024, filed on Feb. 16, 2021, provisional application No. 63/051,877, filed on Jul. 14, 2020, provisional application No. 63/051,851, filed on Jul. 14, 2020.

(56) References Cited

U.S. PATENT DOCUMENTS

| | | | | |
|---|---|---|---|---|
| 6,678,421 B1* | 1/2004 | Daniell | H04N 19/647 | 382/248 |
| 6,801,662 B1* | 10/2004 | Owechko | G06F 18/256 | 382/104 |
| 6,847,737 B1* | 1/2005 | Kouri | G06T 5/10 | 382/275 |
| 7,272,265 B2* | 9/2007 | Kouri | G06V 10/30 | 382/275 |
| 7,474,756 B2* | 1/2009 | Rickard | G06F 18/2134 | 702/194 |
| 7,587,064 B2* | 9/2009 | Owechko | G06V 10/426 | 382/103 |
| 7,720,268 B2* | 5/2010 | Slabaugh | G06T 7/12 | 382/128 |
| 8,031,117 B2* | 10/2011 | Goldberg | H04B 7/10 | 342/377 |
| 9,042,496 B1* | 5/2015 | Su | H04L 27/0012 | 375/346 |
| 9,349,092 B2* | 5/2016 | Thibeault | G06N 20/00 | |
| 9,515,789 B2* | 12/2016 | Zhang | H04L 27/26538 | |
| 9,566,174 B1* | 2/2017 | De Sapio | A61F 2/54 | |
| 9,646,248 B1* | 5/2017 | Benvenuto | G06N 5/022 | |
| 9,749,007 B1* | 8/2017 | Martin | G06N 3/044 | |
| 9,753,959 B2* | 9/2017 | Birdwell | G06N 3/10 | |
| 9,798,751 B2* | 10/2017 | Birdwell | G06N 3/10 | |
| 9,954,561 B2* | 4/2018 | Ray | H04B 1/1638 | |
| 9,978,015 B2* | 5/2018 | Nugent | G06N 3/063 | |
| 10,019,470 B2* | 7/2018 | Birdwell | G06N 3/049 | |
| 10,055,434 B2* | 8/2018 | Birdwell | G06N 3/049 | |
| 10,095,718 B2* | 10/2018 | Birdwell | G06N 3/10 | |
| 10,128,820 B2* | 11/2018 | Petre | G06N 3/065 | |
| 10,153,806 B1* | 12/2018 | Petre | G06N 3/08 | |
| 10,162,378 B1* | 12/2018 | Rao | G06F 1/08 | |
| 10,181,100 B1* | 1/2019 | Benvenuto | G06N 3/04 | |
| 10,192,099 B2* | 1/2019 | Agaian | A61B 5/725 | |
| 10,198,691 B2* | 2/2019 | Nino | G06N 3/049 | |
| 10,217,047 B2* | 2/2019 | O'Shea | H04L 1/0001 | |
| 10,248,675 B2* | 4/2019 | Birdwell | G06N 3/065 | |
| 10,291,268 B1* | 5/2019 | Migliori | G06N 3/088 | |
| 10,305,553 B2* | 5/2019 | O'Shea | G06N 3/045 | |
| 10,310,074 B1* | 6/2019 | Ni | G01S 13/9019 | |
| 10,324,167 B2* | 6/2019 | Ray | G01S 5/12 | |
| 10,324,168 B2* | 6/2019 | Ray | G01S 5/12 | |
| 10,341,669 B2* | 7/2019 | Lin | G06N 3/049 | |
| 10,346,739 B1* | 7/2019 | Dockendorf | G06N 3/08 | |
| 10,374,863 B2* | 8/2019 | Xu | H04L 27/362 | |
| 10,380,062 B1* | 8/2019 | Rao | G06F 18/2134 | |
| 10,396,919 B1* | 8/2019 | O'Shea | H04B 17/373 | |
| 10,397,039 B2* | 8/2019 | Zhang | H04W 72/21 | |
| 10,404,299 B1* | 9/2019 | Petre | H04B 1/10 | |
| 10,429,491 B2* | 10/2019 | Ray | G01S 7/021 | |
| 10,484,043 B1* | 11/2019 | Martin | H04B 1/719 | |
| 10,495,725 B2* | 12/2019 | Zhang | G01S 13/003 | |
| 10,529,320 B2* | 1/2020 | Shafran | G10L 19/0212 | |
| 10,541,765 B1* | 1/2020 | O'Shea | H04L 25/0254 | |
| 10,546,233 B1* | 1/2020 | Bhattacharyya | G06N 3/063 | |
| 10,572,830 B2* | 2/2020 | O'Shea | G06N 3/086 | |
| 10,614,358 B2* | 4/2020 | Nino | G06N 3/049 | |
| 10,643,153 B2* | 5/2020 | O'Shea | G06N 3/08 | |
| 10,671,912 B2* | 6/2020 | Gottfried | G06N 3/049 | |
| 10,671,917 B1* | 6/2020 | Bhattacharyya | G06F 17/16 | |
| 10,712,416 B1* | 7/2020 | Sandino | G06N 3/045 | |
| 10,712,425 B1* | 7/2020 | Rao | G01S 7/354 | |
| 10,720,949 B1* | 7/2020 | Rao | G06N 3/08 | |
| 10,735,298 B2* | 8/2020 | Chen | A61B 5/7253 | |
| 10,742,475 B2* | 8/2020 | Lai | H04L 25/0224 | |
| 10,783,430 B2* | 9/2020 | Wittenberg | H04B 1/123 | |
| 10,788,836 B2* | 9/2020 | Ebrahimi Afrouzi | G05D 1/0246 | |
| 10,789,479 B2* | 9/2020 | Carreira | G06F 18/214 | |
| 10,832,168 B2* | 11/2020 | Krasser | G06N 3/044 | |
| 10,846,595 B2* | 11/2020 | Wild | G06N 3/088 | |
| 10,878,276 B2* | 12/2020 | Martin | G06N 3/08 | |
| 10,892,806 B2* | 1/2021 | O'Shea | G06N 3/044 | |
| 10,921,422 B2* | 2/2021 | Smith | G06F 18/24143 | |
| 10,929,745 B2* | 2/2021 | Birdwell | G06N 3/086 | |
| 10,951,982 B2* | 3/2021 | Hayakawa | H04R 3/005 | |
| 10,986,113 B2* | 4/2021 | De Sapio | G06N 3/049 | |
| 11,002,819 B2* | 5/2021 | Wittenberg | G01S 13/003 | |
| 11,032,014 B2* | 6/2021 | O'Shea | H04L 25/03165 | |
| 11,037,057 B1* | 6/2021 | Virbila | H04B 1/719 | |
| 11,055,614 B2* | 7/2021 | Nino | G06N 3/049 | |
| 11,062,489 B2* | 7/2021 | Chen | G06N 20/20 | |
| 11,069,082 B1* | 7/2021 | Ebrahimi Afrouzi | H04N 23/56 | |
| 11,153,503 B1* | 10/2021 | Ebrahimi Afrouzi | H04N 23/74 | |
| 11,256,988 B1 | 2/2022 | Guerci | | |
| 11,270,198 B2* | 3/2022 | Busch | H04R 25/507 | |
| 11,274,929 B1* | 3/2022 | Afrouzi | G01C 21/165 | |
| 11,282,505 B2* | 3/2022 | Hayakawa | G06N 3/045 | |
| 11,309,839 B2* | 4/2022 | Wen | H03F 1/3247 | |
| 11,366,998 B2* | 6/2022 | Pugsley | G06N 3/063 | |
| 11,366,999 B2* | 6/2022 | Yamamoto | G06N 3/04 | |
| 11,381,286 B2* | 7/2022 | O'Shea | H04B 7/0452 | |
| 11,391,830 B2* | 7/2022 | Au | H04W 48/16 | |
| 11,392,689 B2* | 7/2022 | Nguyen | G06F 21/562 | |
| 11,392,830 B2* | 7/2022 | Ozcan | G06N 3/084 | |
| 11,403,479 B2* | 8/2022 | Cao | G06T 9/00 | |
| 11,423,301 B2* | 8/2022 | O'Shea | H04L 1/0001 | |
| 11,514,325 B2* | 11/2022 | Ozcan | G06V 10/82 | |
| 11,521,053 B2* | 12/2022 | Stepp | G06N 3/049 | |
| 11,521,075 B2* | 12/2022 | Clement | G06N 3/045 | |
| 11,526,424 B2* | 12/2022 | Deng | G06N 3/088 | |
| 11,531,639 B2* | 12/2022 | Petre | G06F 1/10 | |
| 11,575,544 B2* | 2/2023 | Andrews | G06N 3/08 | |
| 11,580,381 B2* | 2/2023 | Daval Frerot | G06N 20/00 | |
| 11,614,514 B2* | 3/2023 | Chen | G01S 7/40 | 342/70 |
| 11,625,557 B2* | 4/2023 | Hoffmann | G06F 18/22 | 382/104 |
| 11,632,181 B2* | 4/2023 | O'Shea | H04W 24/08 | 706/12 |
| 11,638,160 B2* | 4/2023 | Montalvo | H04L 41/0893 | 370/329 |
| 11,657,531 B1* | 5/2023 | Ebrahimi Afrouzi | A47L 11/4025 | 382/284 |
| 11,770,286 B2* | 9/2023 | Timo | H04L 25/0254 | 375/262 |
| 11,783,196 B2* | 10/2023 | O'Shea | G06N 3/086 | 706/12 |
| 11,832,110 B2* | 11/2023 | Montalvo | G06N 20/20 | |
| 11,863,221 B1* | 1/2024 | Adl | G06N 3/045 | |
| 11,868,882 B2* | 1/2024 | Pietquin | G06N 3/092 | |
| 2005/0047611 A1* | 3/2005 | Mao | H04R 3/005 | 381/92 |
| 2010/0158271 A1* | 6/2010 | Park | H04R 3/005 | 381/94.7 |
| 2012/0232418 A1* | 9/2012 | Kimura | A61B 7/04 | 327/551 |
| 2014/0233826 A1* | 8/2014 | Agaian | G06V 20/698 | 382/133 |
| 2014/0241211 A1 | 8/2014 | Zhang | | |
| 2015/0302296 A1* | 10/2015 | Thibeault | G06N 3/08 | 706/25 |
| 2015/0347899 A1* | 12/2015 | Nugent | G06N 3/063 | 706/25 |
| 2016/0132768 A1* | 5/2016 | Ray | G06N 3/08 | 706/22 |
| 2016/0203827 A1* | 7/2016 | Leff | G10L 19/125 | 704/207 |
| 2018/0076795 A1* | 3/2018 | Petre | H04B 1/719 | |
| 2018/0096246 A1* | 4/2018 | Yamamoto | G06N 3/08 | |
| 2018/0174042 A1* | 6/2018 | Srinivasa | G06N 3/088 | |
| 2018/0174053 A1* | 6/2018 | Lin | G06N 3/088 | |

(56) References Cited

U.S. PATENT DOCUMENTS

| | | | |
|---|---|---|---|
| 2018/0307935 A1* | 10/2018 | Rao | G06V 10/764 |
| 2018/0308013 A1* | 10/2018 | O'Shea | G06N 3/086 |
| 2018/0314985 A1* | 11/2018 | O'Shea | G06N 3/045 |
| 2019/0042915 A1* | 2/2019 | Akin | G06N 3/065 |
| 2019/0042916 A1* | 2/2019 | Cao | G06N 3/08 |
| 2019/0042920 A1* | 2/2019 | Akin | G06N 3/049 |
| 2019/0042942 A1* | 2/2019 | Natroshvili | G06N 3/088 |
| 2019/0080210 A1* | 3/2019 | Owechko | G06F 18/256 |
| 2019/0120932 A1* | 4/2019 | Smith | G01S 7/354 |
| 2019/0188565 A1 | 6/2019 | O'Shea | |
| 2019/0205696 A1* | 7/2019 | Owechko | G06F 18/2134 |
| 2019/0230107 A1* | 7/2019 | De Sapio | H04L 63/145 |
| 2019/0251421 A1 | 8/2019 | Wang | |
| 2019/0349037 A1 | 11/2019 | O'Shea | |
| 2020/0034331 A1* | 1/2020 | Petre | G06F 1/10 |
| 2020/0042873 A1 | 2/2020 | Daval Frerot | |
| 2020/0046240 A1* | 2/2020 | Angle | A61B 5/7267 |
| 2020/0066260 A1* | 2/2020 | Hayakawa | G10L 15/22 |
| 2020/0111483 A1* | 4/2020 | Shafran | G06N 3/02 |
| 2020/0218941 A1* | 7/2020 | Wang | G06F 30/20 |
| 2020/0218959 A1* | 7/2020 | Srinivasa | G06N 3/08 |
| 2020/0218977 A1* | 7/2020 | Paul | G06N 3/088 |
| 2020/0225317 A1 | 7/2020 | Chen | |
| 2020/0265290 A1* | 8/2020 | Paul | G06N 5/01 |
| 2020/0265338 A1* | 8/2020 | O'Shea | G06N 3/082 |
| 2020/0272883 A1* | 8/2020 | Cao | G06N 3/006 |
| 2020/0272884 A1* | 8/2020 | Paul | G06N 3/08 |
| 2020/0292660 A1* | 9/2020 | Meissner | G01S 7/354 |
| 2020/0327225 A1* | 10/2020 | Nguyen | G06N 3/084 |
| 2020/0334575 A1* | 10/2020 | O'Shea | G06N 3/082 |
| 2020/0341109 A1* | 10/2020 | Meissner | G01S 7/295 |
| 2020/0342321 A1* | 10/2020 | Paul | G06N 3/049 |
| 2021/0049462 A1* | 2/2021 | Okumura | G06N 3/084 |
| 2021/0093203 A1* | 4/2021 | Zhong | A61B 5/0507 |
| 2021/0133468 A1* | 5/2021 | Chen | G06V 40/174 |
| 2021/0146531 A1* | 5/2021 | Tremblay | G06N 20/00 |
| 2021/0209453 A1* | 7/2021 | Meissner | G06N 3/04 |
| 2021/0304736 A1* | 9/2021 | Kothari | G06N 3/08 |
| 2021/0341436 A1* | 11/2021 | Perdios | G01N 29/4481 |
| 2021/0357187 A1* | 11/2021 | Clement | G06F 8/33 |
| 2021/0357210 A1* | 11/2021 | Clement | G06N 3/084 |
| 2021/0357737 A1* | 11/2021 | Hamerly | G06N 3/048 |
| 2021/0357742 A1* | 11/2021 | Restuccia | G06N 3/063 |
| 2021/0367690 A1* | 11/2021 | O'Shea | H04B 17/3912 |
| 2022/0012637 A1* | 1/2022 | Rezazadegan Tavakoli | G06N 3/088 |
| 2022/0014398 A1* | 1/2022 | Andrews | G06N 3/09 |
| 2022/0055689 A1* | 2/2022 | Mandlekar | B60W 30/06 |
| 2022/0066456 A1* | 3/2022 | Ebrahimi Afrouzi | A47L 9/2873 |
| 2022/0066747 A1* | 3/2022 | Drain | G06F 40/30 |
| 2022/0067983 A1* | 3/2022 | Fidler | G06N 3/047 |
| 2022/0075605 A1* | 3/2022 | Iyer | G06F 8/36 |
| 2022/0198245 A1* | 6/2022 | Cleland | G06N 3/049 |
| 2022/0200669 A1 | 6/2022 | Banuli Nanje Gowda | |
| 2022/0217035 A1* | 7/2022 | Melodia | G06N 3/063 |
| 2022/0222512 A1* | 7/2022 | Virbila | G06N 3/063 |
| 2022/0222513 A1* | 7/2022 | Paramasivam | G06F 1/3237 |
| 2022/0368583 A1* | 11/2022 | Timo | G06N 3/088 |
| 2023/0109019 A1* | 4/2023 | Petre | G06N 3/08 706/22 |
| 2023/0262470 A1* | 8/2023 | Montalvo | G06N 5/022 370/329 |
| 2023/0308192 A1* | 9/2023 | Wittenberg | H04B 1/0475 455/40 |
| 2023/0316083 A1* | 10/2023 | O'Shea | H04W 24/08 706/12 |
| 2023/0324501 A1* | 10/2023 | Feigl | G06N 3/08 342/451 |

FOREIGN PATENT DOCUMENTS

| | | | | |
|---|---|---|---|---|
| CN | 1278104 C | * | 10/2006 | D06F 39/003 |
| CN | 1928500 A | * | 3/2007 | D06F 39/003 |
| CN | 1640084 B | * | 10/2014 | H03C 1/36 |
| CN | 106875002 A | | 6/2017 | |
| CN | 105075156 B | | 1/2018 | |
| CN | 109709521 A | * | 5/2019 | G01S 13/003 |
| CN | 110088635 A | * | 8/2019 | G01S 7/414 |
| CN | 110088635 A | | 8/2019 | |
| CN | 110728324 A | | 1/2020 | |
| CN | 111541466 B | | 3/2021 | |
| CN | 110301143 B | | 4/2022 | |
| CN | 110088635 B | | 9/2022 | |
| DE | 102019106529 A1 | | 9/2020 | |
| DE | 102021132995 A1 | | 6/2022 | |
| EP | 3293681 A1 | * | 3/2018 | G06N 20/00 |
| EP | 2962416 B1 | * | 6/2018 | G06N 3/063 |
| EP | 3660749 A1 | * | 6/2020 | G06N 3/049 |
| EP | 3695783 A1 | * | 8/2020 | A61B 5/0022 |
| EP | 3736976 A1 | * | 11/2020 | H03F 1/02 |
| EP | 3612356 B1 | * | 6/2021 | B25J 9/163 |
| EP | 3637099 B1 | * | 6/2021 | G01N 29/043 |
| EP | 3855388 A1 | * | 7/2021 | G06K 9/46 |
| EP | 3571862 B1 | * | 6/2022 | G06N 20/00 |
| JP | 10128820 A | * | 5/1998 | B29C 45/82 |
| JP | 10153806 A | * | 6/1998 | |
| JP | 10162378 A | * | 6/1998 | |
| JP | 2018077213 A | | 5/2018 | |
| JP | 2018091826 A | | 5/2018 | |
| JP | 2019090795 A | | 6/2019 | |
| JP | 2019090795 A | * | 6/2019 | G01S 13/003 |
| JP | 6758524 B2 | | 9/2020 | |
| JP | 2020203075 A | * | 12/2020 | G01P 15/18 |
| JP | 7049085 B2 | | 4/2022 | |
| JP | 7068792 B2 | * | 5/2022 | G01R 23/167 |
| JP | 7163011 B2 | | 10/2022 | |
| JP | 7228375 B2 | * | 2/2023 | A61B 5/113 |
| WO | WO-2014133506 A1 | * | 9/2014 | G06N 3/063 |
| WO | WO-2018136144 A1 | * | 7/2018 | G01S 7/414 |
| WO | WO-2018136785 A1 | * | 7/2018 | G06N 20/00 |
| WO | WO-2018136785 A9 | * | 8/2018 | G06N 20/00 |
| WO | WO2018136144 A1 | | 11/2018 | |
| WO | WO-2018200529 A1 | | 11/2018 | |
| WO | WO2018204632 A1 | | 11/2018 | |
| WO | WO2018236932 A1 | | 12/2018 | |
| WO | WO-2019002465 A1 | * | 1/2019 | G06N 3/006 |
| WO | WO-2019027926 A1 | * | 2/2019 | G06F 3/16 |
| WO | WO-2019055117 A1 | * | 3/2019 | B62D 15/0265 |
| WO | WO-2019060730 A1 | * | 3/2019 | B25J 9/163 |
| WO | WO-2019161076 A1 | * | 8/2019 | G01R 29/08 |
| WO | WO-2019200289 A1 | | 10/2019 | |
| WO | WO-2019240856 A1 | * | 12/2019 | B62D 15/0265 |
| WO | WO-2020074181 A1 | * | 4/2020 | G01N 29/043 |
| WO | WO2020102204 A1 | | 5/2020 | |
| WO | WO2020210673 A1 | | 10/2020 | |
| WO | WO-2020210673 A1 | * | 10/2020 | G06N 3/0445 |
| WO | WO-2020231005 A1 | * | 11/2020 | G06K 9/46 |
| WO | WO-2020236236 A2 | | 12/2020 | |
| WO | WO-2020236236 A3 | | 12/2020 | |
| WO | WO-2020236236 A9 | | 2/2021 | |

OTHER PUBLICATIONS

H. Syed, R. Bryla, U. Majumder and D. Kudithipudi, "Toward Near-Real-Time Training With Semi-Random Deep Neural Networks and Tensor-Train Decomposition," in IEEE Journal of Selected Topics in Applied Earth Observations and Remote Sensing, vol. 14, pp. 8171-8179, 2021, doi: 10.1109/JSTARS.2021.3096195. (Year: 2021).*

A. Irmanova, O. Krestinskaya and A. P. James, "Neuromorphic Adaptive Edge-Preserving Denoising Filter," 2017 IEEE International Conference on Rebooting Computing (ICRC), Washington, DC, USA, 2017, pp. 1-6, doi: 10.1109/ICRC.2017.8123644. (Year: 2017).*

N. D. Sidiropoulos, L. De Lathauwer, X. Fu, K. Huang, E. E. Papalexakis and C. Faloutsos, "Tensor Decomposition for Signal Processing and Machine Learning," in IEEE Transactions on Signal Processing, vol. 65, No. 13, pp. 3551-3582, 1 Jul. 1, 2017, doi: 10.1109/TSP.2017.2690524. (Year: 2017).*

(56) References Cited

OTHER PUBLICATIONS

S. Choi, A. Cichocki, H.-M. Park, and S.-Y. Lee, "Blind Source Separation and Independent Component Analysis: A Review," Neural Information Processing—Letters, vol. 6, No. 1, Jan. 2005, pp. 1-57.
A. Cichocki and A. Belouchrani, "Sources separation of temporally correlated sources from noisy data using a bank of band-pass filters," in Proc. of Independent Component Analysis and Signal Separation (ICA-2001), pp. 173-178, San Diego, USA, Dec. 9-13, 2001.
A. Hyvarinen, "Complexity Pursuit: Separating Interesting Components from Time Series," Neural Computation, vol. 13, No. 4, pp. 883-898, Apr. 2001.
Igel, C. and Husken, M., "Improving the Rprop learning algorithm", in Proc. of the 2nd Int. Symposium on Neural Computation (NC'2000), pp. 115-121, ICSC Academic Press, 2000.
R. Legenstein, et al. "Edge of Chaos and Prediction of Computational Performance for Neural Microcircuit Models," Neural Networks, 20(3), pp. 323-334, 2007.
W. Maass, "Liquid Computing", Proc. of the Conference CIE'07 : Computability in Europe 2007, Siena (Italy), pp. 507-516.
F. Takens, "Detecting Strange Attractors in Turbulence," Dynamical Systems and Turbulence, Lecture Notes in Mathematics vol. 898, 1981, pp. 366-381.
D. Verstraeten, et al. "An experimental unification of reservoir computing methods", Neural Networks, vol. 20, No. 3, Apr. 2007, pp. 391-403.
R. H. Walden, "Analog-to-digital converter survey and analysis," IEEE J. Sel. Areas Commun., vol. 51, pp. 539-548, 1999.
H. Yap, et al., "A First Analysis of the Stability of Takens' Embedding," in Proc. of the IEEE Global Conference on Signal and Information Processing (GlobalSIP) symposium on Information Processing for Big Data, Dec. 2014, pp. 404-408.
Office Action 1 for U.S. Appl. No. 15/817,906, Date mailed: Feb. 23, 2018.
Response to Office Action 1 for U.S. Appl. No. 15/817,906, Date mailed: May 23, 2018.
Notice of Allowance for U.S. Appl. No. 15/817,906, Date mailed: Jul. 6, 2018.
Notification of Transmittal of International Search Report and the Written Opinion of the International Searching Authority for PCT/US2017/062561 ; date of mailing Feb. 6, 2018.
International Search Report of the International Searching Authority forPCT/US2017/062561; date of mailing Feb. 6, 2018.
Written Opinion of the International Searching Authority for PCT/US2017/062561; date of mailing Feb. 6, 2018.
Notification of International Preliminary Report on Patentability (Chapter I) for PCT/US2017/062561; date of mailing Aug. 1, 2019.
International Preliminary Report on Patentability (Chapter I) for PCT/US2017/062561; date of mailing Aug. 1, 2019.
M. Lukosevicius, H. Jaeger: "Reservoir computing approaches to recurrent neural network training", Computer Science Review (2009), Computer Science Review 3 ( 2009 ) pp. 127-149.
Jing Dai, et al.: "An Introduction to the Echo State Network and its Applications in Power System", 2009 15th International Conference on Intelligent System Applications to Power Systems, IEEE, pp. 1-7.
Office Action 1 for U.S. Appl. No. 17/375,724, Date mailed: Dec. 23, 2022.
Response to Office Action 1 for U.S. Appl. No. 17/375,724, Date mailed: Mar. 22, 2023.
Office Action 2 for U.S. Appl. No. 17/375,724, Date mailed: May 2, 2023.
A. Irmanova, 0. Krestinskaya and A. P. James, "Neuromorphic Adaptive Edge-Preserving Denoising Filter," 2017 IEEE International Conference on Rebooting Computing (ICRC), 2017, pp. 1-6, doi: 10.1109/ICRC.2017.8123644. (Year: 2017).
Benjamin et al. Neurogrid—A Mixed-Analog-Digital Multichip System for Large-Scale Neural Simulation, IEEE 2014 (Year: 2014).
Neuromorphic Computing with Intel's Loihi 2 chip—Technology Brief, 2021 (Year: 2021).
Office Action 1 for Chinese Patent Application No. 201780078246.2, Dated: Dec. 3, 2020.
English translation of Office Action 1 for Chinese Patent Application No. 201780078246.2, Date mailed: Dec. 3, 2020.
Andrius Petrenas, "Reservoir Computing for Extraction of Low Amplitude Atrial Activity in Atrial Fibrillation", Computing in Cardiology(CINC), pp. 13-16.
Response to Office Action 1 for Chinese Patent Application No. 201780078246.2, Date filed Apr. 14, 2021.
English translation of amended claims in Response to Office Action 1 for Chinese Patent Application No. 201780078246.2, Date filed Apr. 14, 2021.
Office Action 2 for Chinese Patent Application No. 201780078246.2, Dated: Jul. 21, 2021.
English translation of Office Action 2 for Chinese Patent Application No. 201780078246.2, Date mailed: Jul. 21, 2021.
Response to Office Action 2 for Chinese Patent Application No. 201780078246.2, Date filed Sep. 13, 2021.
English translation of amended claims in Response to Office Action 2 for Chinese Patent Application No. 201780078246.2, Date filed Sep. 13, 2021.
Decision of Rejection for Chinese Patent Application No. 201780078246.2, Dated: Jan. 4, 2022.
Request for Reexamination for Chinese Patent Application No. 201780078246.2, Filed Mar. 30, 2022.
English translation of amended claims in Request for Reexamination for Chinese Patent Application No. 201780078246.2, Date filed Mar. 30, 2022.
Reexamination Decision for Chinese Patent Application No. 201780078246.2, Dated May 6, 2022.
Amendment for Chinese Patent Application No. 201780078246.2, Dated Jun. 20, 2022.
English translation of amended claims in Amendment for Chinese Patent Application No. 201780078246.2, Date filed Jun. 20, 2022.
Notice of Allowance for Chinese Patent Application No. 201780078246.2, Date filed Jul. 5, 2022.
English translation of Notice of Allowance for Chinese Patent Application No. 201780078246.2, Date filed Jul. 5, 2022.
Patent Certificate for Chinese Patent No. CN 110088635 B, Dated Sep. 20, 2022.
English translation of the Patent Certificate for Chinese Patent No. CN 110088635 B, Dated Sep. 20, 2022.
Communication pursuant to Rules 161 (2) and 162 EPC for European Regional Phase Patent Application No. 17892664.8, dated Aug. 27, 2019.
Response to the communication pursuant to Rules 161(2) and 162 EPC for European Regional Phase Patent Application No. 17892664.8, dated Mar. 6, 2020.
Communication pursuant to Rules 70(2) and 70a(2) EPC (the supplementary European search report) for the European Regional Phase Patent Application No. 17892664.8, dated Oct. 22, 2020.
Andrius Petrenas, et al, "Reservoir computing for extraction of low amplitude atrial activity in atrial fibrillation," Computing in Cardiology (CINC). 2012. IEEE. Sep. 9, 2012 (Sep. 9, 2012). pp. 13-16. XP032317043. ISBN: 978-1-4673-2076-4.
Ali Deihimi, et al, "Application of echo state network for harmonic detection in distribution networks," IET Generation. Transmission &Distribution. vol. 11. No. 5. Dec. 21, 2016 (Dec. 21, 2016). pp. 1094-1101 . XP055733455.
Herbert Jaeger, "Controlling Recurrent Neural Networks by Conceptors," Technical Report No. 31, Jul. 22, 2016 (Jul. 22, 2016). XP055732541, Retrieved from the Internet: URL:https:jarxiv. orgjpdf/1 403.3 369v2.pdf [retrieved on Sep. 21, 2020].
Ozturk, et al, "An associative memory readout for ESNs with applications to dynamical pattem recognition," Neural Networks. Elsevier Science Publishers. Barking. GB. vol. 20. No. 3. Jun. 5, 2007 (Jun. 5, 2007). pp. 377-390. XP022104570.
Response to the communication pursuant to Rules 70(2) and 70a(2) EPC (the supplementary European search report) for the European Regional Phase Patent Application No. 17892664.8, dated Apr. 22, 2021.

(56) References Cited

OTHER PUBLICATIONS

Pathak et al., entitled, "Hybrid forecasting of chaotic processes: Using machine learning in conjunction with a knowledge-based model," arXiv:1803.04779, 2018, pp. 1-9.

M. Lukosevicius and H. Jaeger, "Reservoir computing approaches to recurrent neural network training", Computer Science Review, 2009, pp. 127-149.

Jing Dai, et al., "An Introduction to the Echo State Network and its Applications in Power System", 15th International Conference on Intelligent System Applications to Power Systems, 2009, pp. 1-7.

Response to Office Action 2 for U.S. Appl. No. 17/375,724, Date mailed: Aug. 1, 2023.

Notice of Allowance for U.S. Appl. No. 17/375,724, Date mailed: Aug. 21, 2023.

* cited by examiner

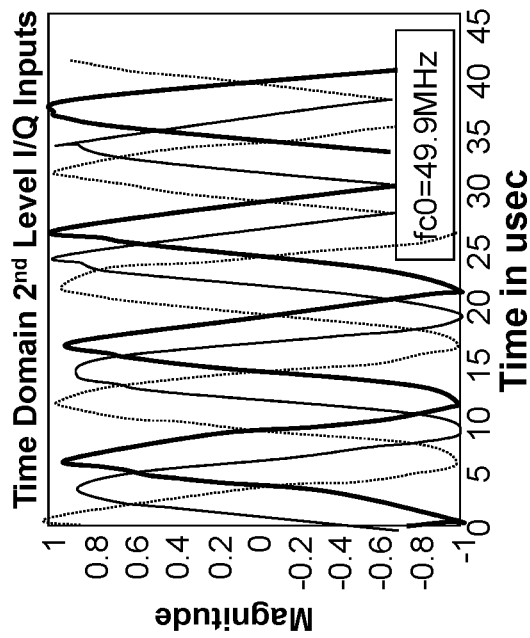
FIG. 5A
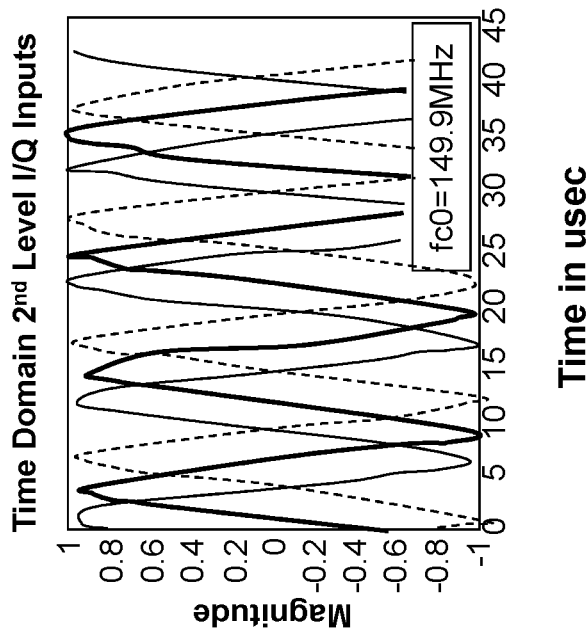
FIG. 5B
*Real Valued Wideband Input Data*
*fc0=49.9 MHz*
*fc0=50.1 MHz*
*fc0=149.9 MHz*
*fc0=150.1 MHz*
*fs=400 MHz*
*BW=[0 200] MHz*
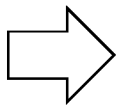
*All four frequencies translate into the same 2nd level baseband frequency*
*|fc2|=0.1 MHz*

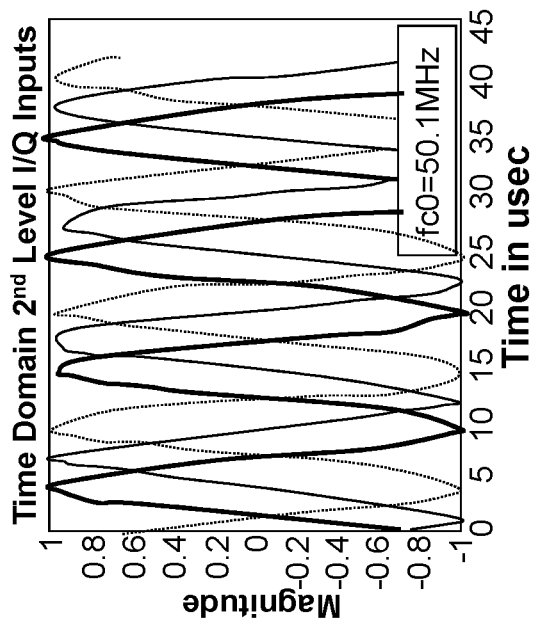
FIG. 5C
*Real Valued Wideband Input Data*
*fc0=49.9 MHz*
*fc0=50.1 MHz*
*fc0=149.9 MHz*
*fc0=150.1 MHz*
*fs=400 MHz*
*BW=[0 200] MHz*
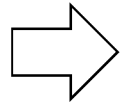
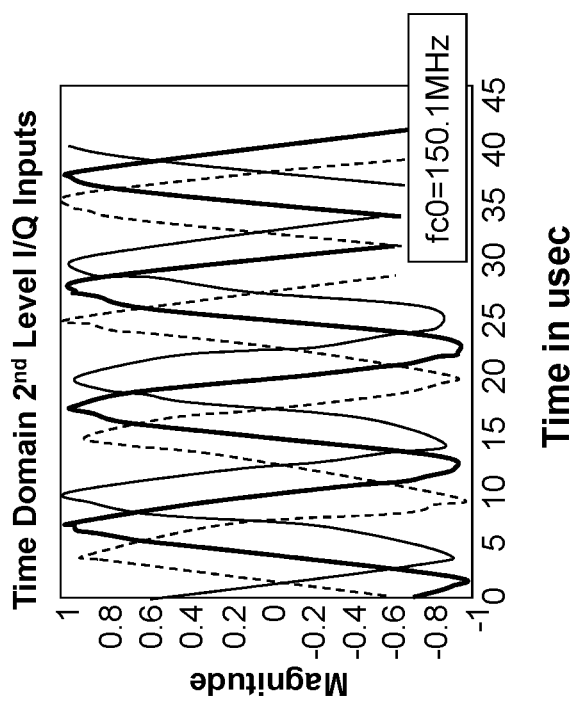
FIG. 5D
*All four frequencies translate into the same 2nd level baseband frequency |fc2|=0.1 MHz*

FIG. 6A $$\begin{bmatrix} \dot{x}_{II} \\ \dot{x}_{IQ} \\ \dot{x}_{QI} \\ \dot{x}_{QQ} \end{bmatrix} = \frac{\omega_0}{2} \begin{bmatrix} -\frac{3}{Q_0} & -1 & 1 & \frac{1}{Q_0} \\ 1 & -\frac{3}{Q_0} & \frac{1}{Q_0} & 1 \\ -1 & -\frac{1}{Q_0} & -\frac{3}{Q_0} & -1 \\ -\frac{1}{Q_0} & 1 & 1 & -\frac{3}{Q_0} \end{bmatrix} \begin{bmatrix} x_{II} \\ x_{IQ} \\ x_{QI} \\ x_{QQ} \end{bmatrix}$$

FIG. 6B $$\begin{bmatrix} \dot{x}_{II} \\ \dot{x}_{IQ} \\ \dot{x}_{QI} \\ \dot{x}_{QQ} \end{bmatrix} = \frac{\omega_0}{2} \begin{bmatrix} -\frac{3}{Q_0} & 1 & -1 & \frac{1}{Q_0} \\ -1 & -\frac{3}{Q_0} & \frac{1}{Q_0} & -1 \\ 1 & -\frac{1}{Q_0} & -\frac{3}{Q_0} & 1 \\ -\frac{1}{Q_0} & -1 & 1 & -\frac{3}{Q_0} \end{bmatrix} \begin{bmatrix} x_{II} \\ x_{IQ} \\ x_{QI} \\ x_{QQ} \end{bmatrix}$$

FIG. 6C $$\begin{bmatrix} \dot{x}_{II} \\ \dot{x}_{IQ} \\ \dot{x}_{QI} \\ \dot{x}_{QQ} \end{bmatrix} = \frac{\omega_0}{2} \begin{bmatrix} -\frac{3}{Q_0} & 1 & -1 & \frac{1}{Q_0} \\ 1 & -\frac{3}{Q_0} & \frac{1}{Q_0} & -1 \\ -1 & -\frac{1}{Q_0} & -\frac{3}{Q_0} & 1 \\ \frac{1}{Q_0} & -1 & 1 & -\frac{3}{Q_0} \end{bmatrix} \begin{bmatrix} x_{II} \\ x_{IQ} \\ x_{QI} \\ x_{QQ} \end{bmatrix}$$

FIG. 6D $$\begin{bmatrix} \dot{x}_{II} \\ \dot{x}_{IQ} \\ \dot{x}_{QI} \\ \dot{x}_{QQ} \end{bmatrix} = \frac{\omega_0}{2} \begin{bmatrix} -\frac{3}{Q_0} & -1 & 1 & \frac{1}{Q_0} \\ -1 & -\frac{3}{Q_0} & \frac{1}{Q_0} & 1 \\ 1 & -\frac{1}{Q_0} & -\frac{3}{Q_0} & -1 \\ \frac{1}{Q_0} & 1 & 1 & -\frac{3}{Q_0} \end{bmatrix} \begin{bmatrix} x_{II} \\ x_{IQ} \\ x_{QI} \\ x_{QQ} \end{bmatrix}$$

ULTRA-WIDE INSTANTANEOUS BANDWIDTH COMPLEX NEUROMORPHIC ADAPTIVE CORE PROCESSOR

CROSS-REFERENCE TO RELATED APPLICATIONS

This is a Continuation-in-Part application of U.S. application Ser. No. 17/375,724, filed in the United States on Jul. 14, 2021, entitled, "Low Size, Weight and Power (SWAP) Efficient Hardware Implementation of a Wide Instantaneous Bandwidth Neuromorphic Adaptive Core (NeurACore)", which is a Non-Provisional Application of U.S. Provisional Application No. 63/051,877, filed on Jul. 14, 2020 and U.S. Provisional Application No. 63/051,851, filed on Jul. 14, 2020, the entirety of which are hereby incorporated by reference.

This is also a Non-Provisional Application of U.S. Provisional Application No. 63/150,024, filed in the United States on Feb. 16, 2021, entitled, "Ultra-Wide Instantaneous Bandwidth Complex Neuromorphic Adaptive Core Processor," the entirety of which is incorporated herein by reference.

BACKGROUND OF INVENTION

(1) Field of Invention

The present invention relates to a signal processor and, more particularly, to a signal processor for complex signal denoising in the ultra-wide instantaneous bandwidth.

(2) Description of Related Art

Noise reduction, or denoising, is the process of removing noise from a signal. Noise reduction techniques exist for audio and images. All signal processing devices, both analog and digital, have traits that make them susceptible to noise. Noise can be random or white noise with an even frequency distribution, or frequency-dependent noise introduced by a device's mechanism or signal processing algorithms.

Current systems, such as conventional channelizers, operate over a smaller frequency band and require a large latency to achieve processing results. A channelizer is a term used for algorithms which select a certain frequency band from an input signal. The input signal typically has a higher sample rate that the sample rate of the selected channel. A channelizer is also used for algorithms that select multiple channels from an input signal in an efficient manner. Additionally, current machine learning approaches to signal processing require large quantities of online/offline training data.

Thus, a continuing need exists for a system that does not require any pre-training and enables real-time signal denoising in the ultra-wide bandwidth for both real-valued and complex input signals.

SUMMARY OF INVENTION

The present invention relates to a signal processor and, more particularly, to a Neuromorphic Adaptive Core (NeurACore) signal processor for complex signal denoising in ultra-wide instantaneous bandwidth. The NeurACore signal processor comprises a digital signal pre-processing unit operable for performing cascaded decomposition of a wideband complex valued In-phase and Quadrature-phase (I/Q) input signal in real time. The wideband complex valued I/Q input signal is decomposed into I and Q sub-channels. The NeurACore signal processor further comprises a NeurACore and local learning layers operable for performing high-dimensional projection of the wideband complex valued I/Q input signal into a high-dimensional state space. A global learning layer of the NeurACore signal processor is operable for performing a gradient descent online learning algorithm, and a neural combiner operable for combining outputs of the global learning layer to compute signal predictions corresponding to the wideband complex valued I/Q input signal.

In another aspect, the cascaded decomposition is a multi-layered I/Q decomposition scheme, wherein for each layer, a sample rate of the layer is reduced by half compared to a preceding layer in the cascaded decomposition.

In another aspect, the cascaded decomposition is a three layer I/Q decomposition scheme, and wherein the gradient descent online learning algorithm is an eight-dimensional gradient descent online learning algorithm.

In another aspect, the gradient descent online learning algorithm uses eight-dimensional state variables and weight matrices by cross coupling the eight-dimensional state variables in weights update equations and output layer update equations.

In another aspect, the digital signal pre-processing is further operable for implementing blind source separation (BSS) and feature extraction algorithms with updates to interpret denoised eight-dimensional state variables.

In another aspect, the NeurACore comprises high-dimensional signal processing nodes with adaptable parameters.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 5A is an illustration of a first example of a phase relationship between $2^{nd}$ level resonator state functions according to some embodiments of the present disclosure;

FIG. 5B is an illustration of a second example of a phase relationship between $2^{nd}$ level resonator state functions according to some embodiments of the present disclosure;

FIG. 5C is an illustration of a third example of a phase relationship between $2^{nd}$ level resonator state functions according to some embodiments of the present disclosure;

FIG. 5D is an illustration of a fourth example of a phase relationship between $2^{nd}$ level resonator state functions according to some embodiments of the present disclosure;

FIG. 6A is an illustration of an ordinary differential equation for a first four-dimensional (4D) passive oscillator with the same $2^{nd}$ level baseband frequency according to some embodiments of the present disclosure;

FIG. 6B is an illustration of an ordinary differential equation for a second 4D passive oscillator with the same $2^{nd}$ level baseband frequency according to some embodiments of the present disclosure;

FIG. 6C is an illustration of an ordinary differential equation for a third 4D passive oscillator with the same $2^{nd}$ level baseband frequency according to some embodiments of the present disclosure;

FIG. 6D is an illustration of an ordinary differential equation for a second 4D passive oscillator with the same $2^{nd}$ level baseband frequency according to some embodiments of the present disclosure;

FIG. 8B is an illustration of the frequency domain response of the resonator that is designed to resonate at 600 MHz in the original band with the Q value set for 10 according to some embodiments of the present disclosure.

DETAILED DESCRIPTION

Figure 1:
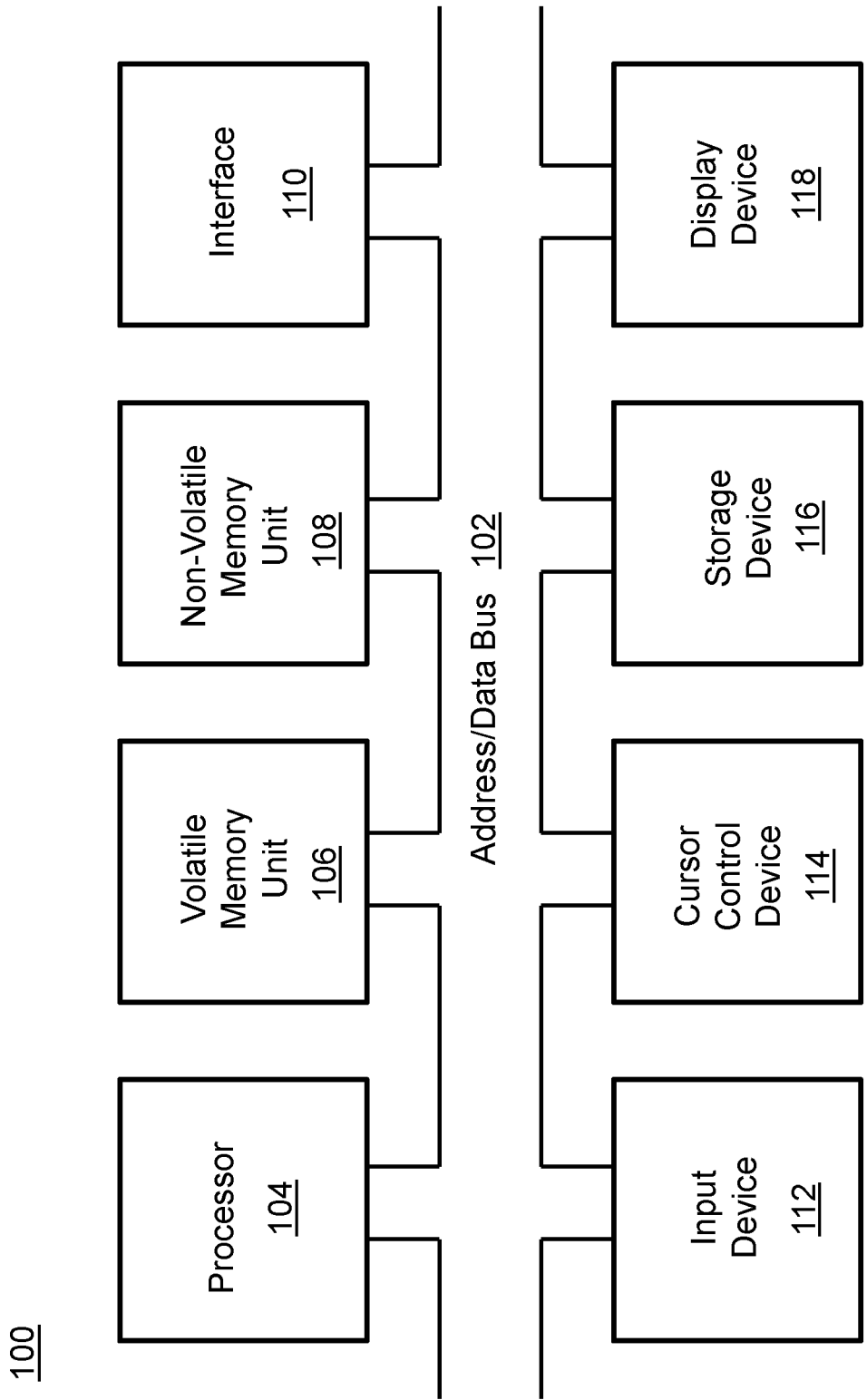
FIG. 1 is a block diagram depicting the components of a system for complex signal denoising according to some embodiments of the present disclosure.

The present invention relates to a signal processor and, more particularly, to a signal processor for complex signal denoising in the ultra-wide instantaneous bandwidth. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent, or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

(1) Principal Aspects

Various embodiments of the invention include three "principal" aspects. The first is a system for complex signal denoising. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys.

Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
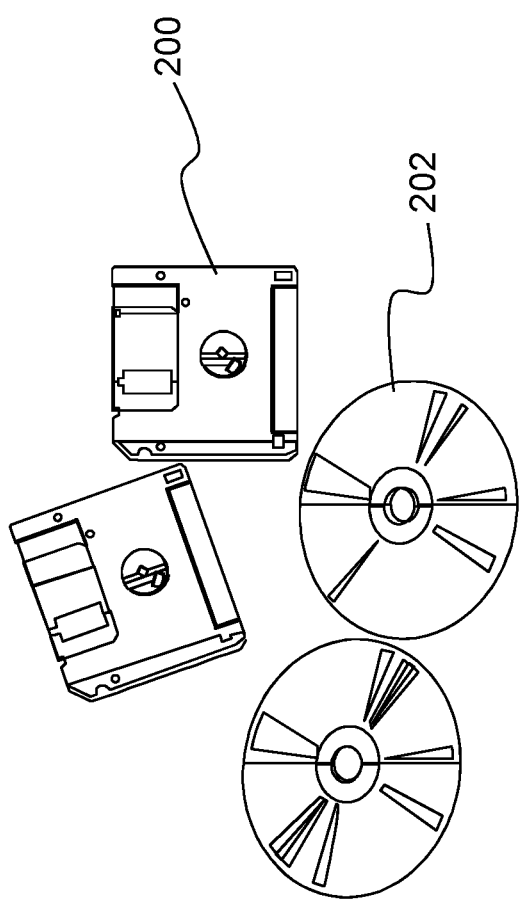
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e., computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(2) Specific Details of Various Embodiments of the Invention Described is an implementation of the Ultra-Wide Instantaneous Bandwidth (IBW) Neuromorphic Adaptive Core (NeurACore) processor, used for the denoising of real-valued and complex In-Phase and Quadrature-Phase (I/Q) signals (i.e., signals in ultra-wide IBW). IBW refers to the bandwidth in which all frequency components can be simultaneously analyzed. The term "real-time bandwidth" is often used interchangeably with IBW to describe the maximum continuous radio frequency (RF) bandwidth that an instrument generates or acquires. A real-valued signal is a complex signal where all the imaginary component of all the complex values are strictly zero. Real-valued signals have one degree of freedom. Complex signals are often used to represent signals, or data, with two degrees of freedom, such as magnitude and phase, or kinetic and potential energy.

The invention described herein is a system for real-time, real-valued and complex I/Q signal denoising in ultra-wide IBW with processor clock speed that is lower than the data sampling rate. The denoiser according to embodiments of the present disclosure provides detection and denoising capabilities for complex (I/Q) signals, including low probability of intercept (LPI), low probability of detection (LPD), and frequency hopping signals. A LPI radar is a radar employing measures to avoid detection by passive radar detection equipment (such as a radar warning receiver (RWR), or electronic support receiver) while it is searching for a target or engaged in target tracking. LPI and LPD allow an active acoustic source to be concealed or camouflaged so that the signal is essentially undetectable. Frequency-hopping spread spectrum (FHSS) is a method of transmitting radio signals by rapidly changing the carrier frequency among many distinct frequencies occupying a large spectral band. Signals rapidly change, or hop, their carrier frequencies among the center frequencies of these sub-bands in a predetermined order.

Additionally, the denoiser improves the signal-to-noise ratio (SNR) performance by >20 decibels (dB) for a variety of different waveforms, as will be described in detail below. Key advantages of the present invention compared to current state-of-the art systems are the ultra-low latency detection and denoising of wideband input signals. Comparable systems, like a conventional channelizer, would operate over a smaller frequency band and likely require larger latency to achieve the same processing results. Additionally, the system enables detection and denoising of fast frequency hopping signals that cannot be achieved with current frequency channelization-based systems. While current machine learning approaches would require large quantities of online/offline training data, the system described herein does not require any pre-training.

The ultra-wide IBW for the real-time digital signal processing system (i.e., NeurACore) according to embodiments of the present disclosure is defined as where the incoming signal's sample rate is larger than the digital signal processor's (i.e., NeurACore) clock speed. Here, it is assumed that the input signal is uniformly sampled with a sampling clock whose clock speed is fs (sampling frequency, or sampling rate) The samples are quantized and fed to the digital signal processor whose clock rate is fc. In computing, the clock rate refers to the frequency at which the clock generator of a processor can generate pulses, which are used to synchronize the operation of its components. The clock rate is used as an indicator of the processor's speed and is measured in clock cycles per second. The heart of the invention described herein is a cascaded I/Q decomposition that enables NeurACore to achieve an instantaneous bandwidth (IBW) that is significantly higher than the clock speed of the digital processor. The system described herein, which is an ultra-wide IBW real-time denoiser (where fs>fc), greatly improves SWAP (size, weight, and power) of hardware over comparable systems with the same performance, such as a conventional channelizer. In the present invention, the sampling rate is twice the IBW. The input signal with a channelizer typically has a higher sample rate than the sample rate of the selected channel.

Figure 3:
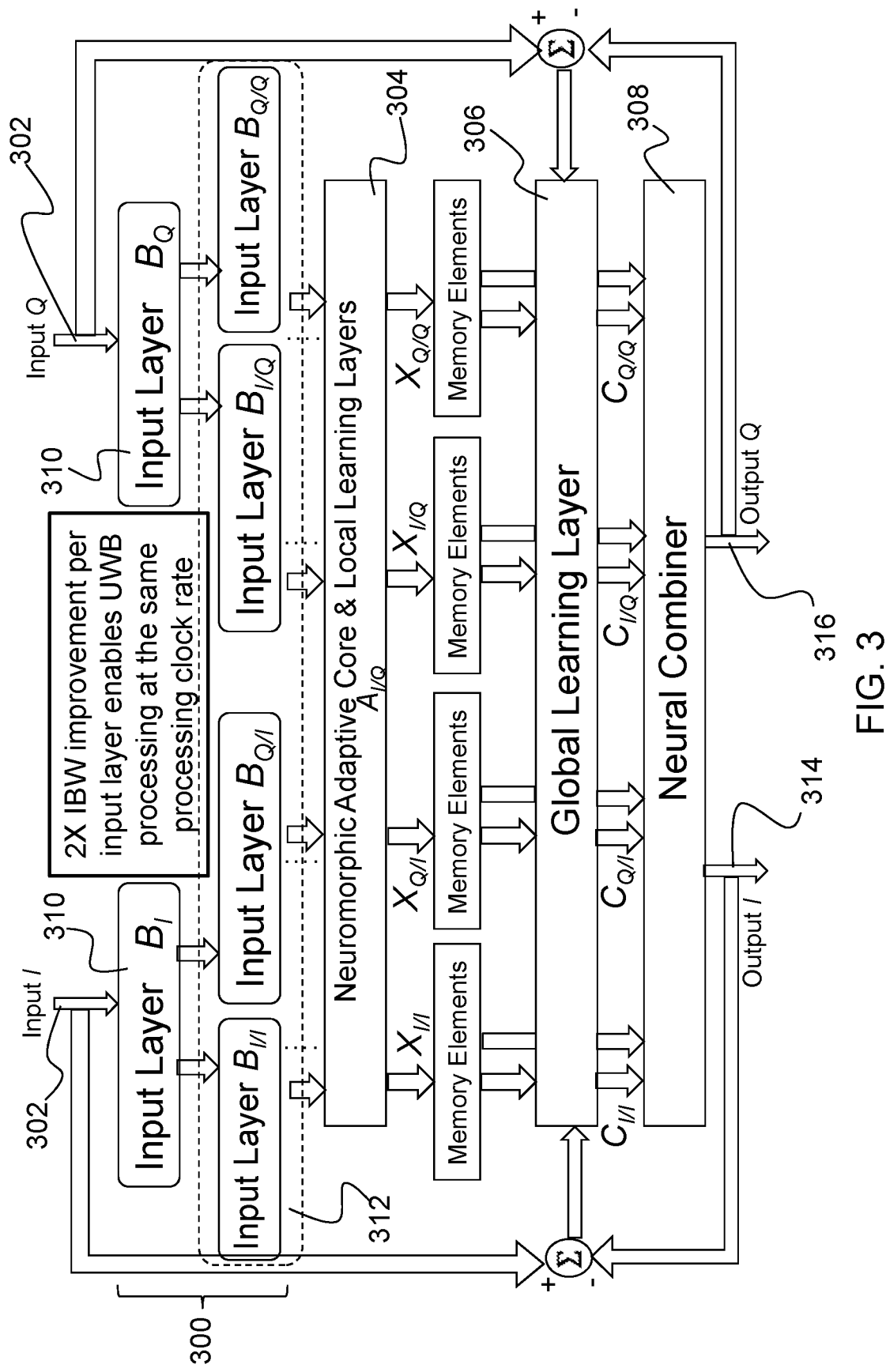
FIG. 3 is an illustration of an ultra-wideband Neuromorphic Adaptive Core (NeurACore) architecture according to some embodiments of the present disclosure.

The NeurACore processor architecture, depicted in FIG. 3, consists of several elements. A high-speed (e.g., IBW greater than 200 MHz) digital signal pre-processing unit 300 performs cascaded I/Q decomposition of the complex input signal 302 in real time. A neuromorphic adaptive core and local learning layers 304 perform high-dimensional projection of the input signal into the high-dimensional state space of the core's dynamical model, where $A_{I/Q}$ represents the core state-space coefficients. A global learning layer 306 (i.e., output layer that performs the gradient descent online learning) and neural combiner 308 perform gradient descent-based online learning of the output layer weights from the global learning layer 306 to achieve short-term signal prediction of the input signal without any knowledge of the signal itself. The neural combiner 308 combines the I and Q outputs from the global learning layer 306. Output I 314 and Output Q 316 represent the signal predictions.

As described above, a unique concept of the invention is the cascaded I/Q signal decomposition and related signal processing algorithms where the wideband complex valued (I/Q) input signal 302 is further decomposed into I and Q sub-channels (i.e., I of I, Q of I, I of Q and Q of Q) for a two layer I/Q decomposition scheme. The advantage of the two layer I/Q signal decomposition is that the sample rate of the four correlated sub-channels is reduced by a factor of two compared to the sample rate of the $1^{st}$ layer I/Q decomposed input signal 310. This cascading operation can be continued until the condition of fscas<=fc is satisfied. Here, fscas is the required sample rate for the time series data at the last cascading layer. For every new cascading layer, the sample rate is reduced by half (i.e., fscas=fs/2 for a single layer, fscas=fs/4 for two layers, fscas=fs/8 for three layers), where fs is the sample rate of the real-valued input signal.

(2.1) Ultra-Wideband NeurACore Architecture

The basic innovation that enables the ultra-wideband NeurACore architecture is shown in FIG. 3. To increase the bandwidth of NeurACore beyond the clock speed of the digital processor (i.e., $f_{sampling} \gg f_{clock}$), the unique concept of cascaded In-phase and Quadrature-phase (I/Q) signal decomposition and related signal processing algorithms was utilized, as described above. The I/Q decomposition ensures unique and invertible signal transformation between the original I/Q input and its decomposed counterpart, so interpreting and converting back these low sample rate multidimensional signals into the original I/Q signal is always possible.

These cascaded I/Q signal decompositions can be continued to many levels, ensuring that the actual digital signal processor clock speed can always be larger than the sample rate of the last decomposition level (i.e., $f_{final\ I/Q\ sampling} < f_{clock}$). For example, an existing NeurACore hardware implementation (disclosed in U.S. application Ser.

No. 17/375,724, which is hereby incorporated by reference as though fully set forth herein) operated at 300 MSps (mega samples per second), so a three layer I/Q signal decomposition will ensure processing signals with >1 gigahertz (GHz) IBW. This means that most of the internal signals used in the Core and Blind Source Separation (BSS) will be eight-dimensional so one must use an eight-dimensional gradient descent online learning algorithm, as described in detail below.

The following are references that describe the use of the gradient descent online learning algorithm for updating output layer weights for an online learning system: M. Lukosevicius and H. Jaeger, "Reservoir computing approaches to recurrent neural network training", Computer Science Review, 2009, and Jing Dai, et al., "An Introduction to the Echo State Network and its Applications in Power System", 15th International Conference on Intelligent System Applications to Power Systems, 2009, both of which are hereby incorporated by reference as though fully set forth herein. The system according to embodiments of the present disclosure improves upon these approaches by extending the signal processing bandwidth beyond the clock speed of the processor (fs>fc), where the real-time denoising processing algorithm is implemented, and extending the basic gradient descent online learning algorithm into the cascaded I/Q decomposed signal domain. By utilizing additional learning layers, such as the global learning layer, along with the extended capability of the neuromorphic adaptive core 304, the present invention enables real-time signal denoising in ultra-wide bandwidth for both real-valued and complex (I/Q) input signals.

The most challenging aspect of the unique cascaded I/Q decomposition-based signal processing concept is to design the state space models for the nodes in the neuromorphic adaptive core that behave the same way as the nodes in the current, not cascaded, design (i.e., passive resonators with adaptable Q-values and resonant frequencies). In the current design, the standard two-dimensional state space models are used for these passive resonators that must be abstracted to high-dimensional models, assuming that their state space models will be driven by the cascaded I/Q decomposed high dimensional signals. In other words, one needs to design an abstract high-dimensional oscillator array with adaptable parameters. HRL Laboratories, LLC has developed and verified, by analysis and MatLab simulations, such abstract high dimensional signal processing nodes that form the key building blocks for the ultra-wide bandwidth NeurACore, as described in U.S. application Ser. No. 17/375,724.

The other significant algorithm change in the ultra-wide bandwidth NeurACore design compared to the previously disclosed, not cascaded, version is the online learning algorithm that must utilize the high-dimensional state variables from the core in the online learning/adaptation process. HRL Laboratories, LLC has developed such gradient descent online learning algorithm that is currently utilized in the existing NeurACore field-programmable gate array (FPGA) hardware prototype, as described in U.S. application Ser. No. 17/375,724. In the current hardware implementation, the learning algorithm utilizes two-dimensional (I and Q) state variables along with two-dimensional weight matrices. For the ultra-wide bandwidth NeurACore architecture described herein, the learning algorithm is extended to eight-dimensional state variables and weight matrices by properly cross coupling the eight-dimensional state variables in the weights update and output update equations.

Optionally, the disclosed ultra-wide IBW NeurACore can be extended with Blind Source Separation (BSS) and feature extractions algorithms that also need to be updated to properly interpret the denoised eight-dimensional state variables in order to accurately separate the unknown signal(s) from the signal mixture where all signals are represented by eight-dimensional state variables. Energy and phase maps for the real-time spectrogram are generated from the eight-dimensional state variables. At this stage of the processing one can convert back the abstract high-dimensional energy and phase maps into conventional spectrogram image(s) for the classification algorithm that is trained on conventional spectrogram images. However, the processing scheme described herein enables new classification approaches, where the classifier (e.g., deep learning neural network) can be trained directly on the high-dimensional energy and phase maps. It is believed that the high-dimensional energy and phase maps contain significantly more unique features about the signals than conventional spectrograms and will enable significantly improved classification performance. To increase the bandwidth of the NeurACore beyond the clock speed of the digital processor (i.e., $f_{sampling} >> f_{clock}$), cascaded In-phase and Quadrature-phase (I/Q) signal decomposition and related signal processing algorithms are utilized. The wideband, complex-valued (I/Q) input signal is further decomposed into I and Q sub-channels (i.e., I of I, Q of I, I of Q and Q of Q) for a two layer I/Q decomposition, as shown in FIG. 3.

Figure 4A:
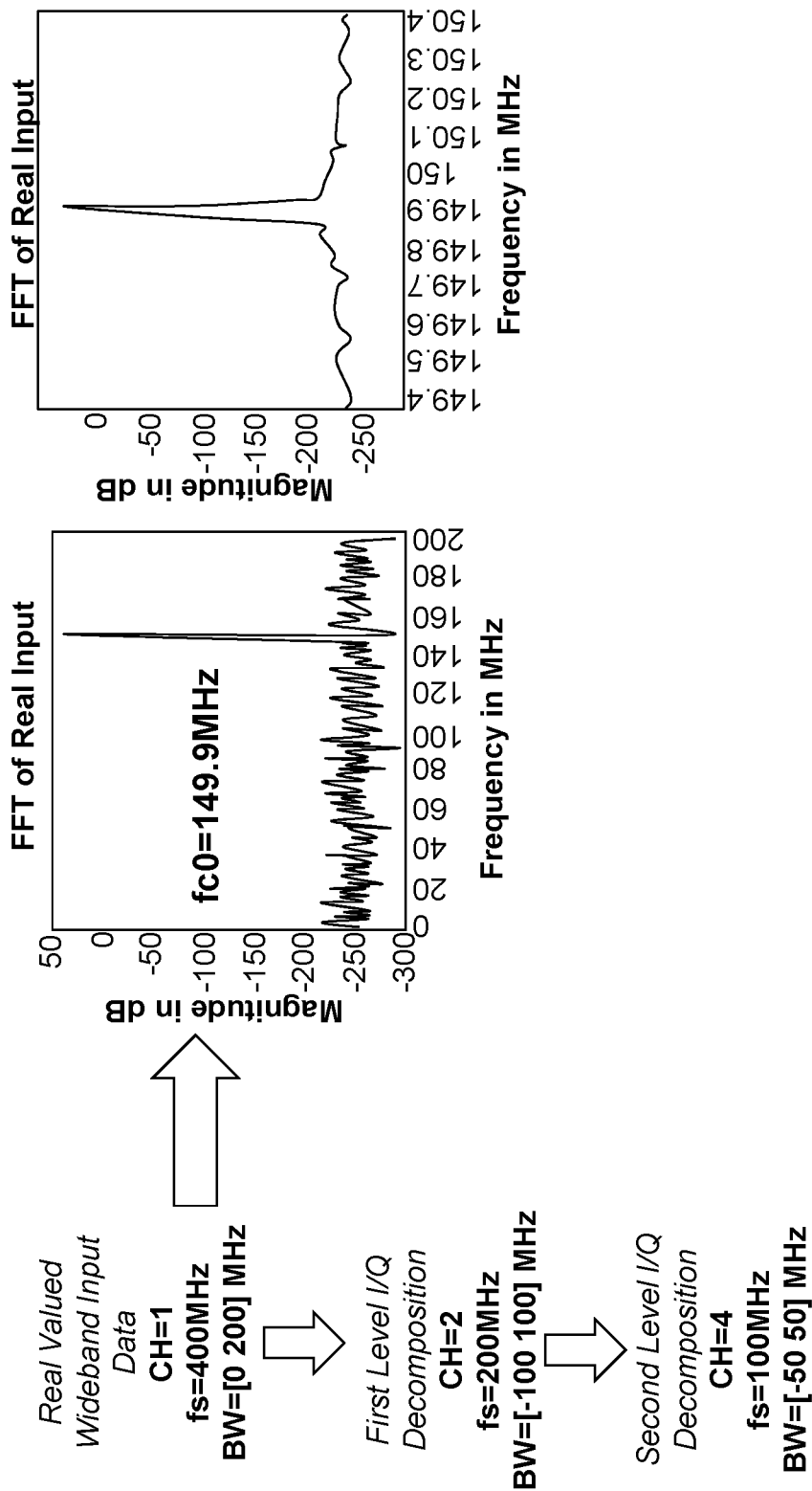
FIG. 4A is an illustration of real valued wideband input data in a cascaded In-Phase and Quadrature-Phase (I/Q) decomposition concept of frequency translation of a single tone according to some embodiments of the present disclosure.
Figure 4B:
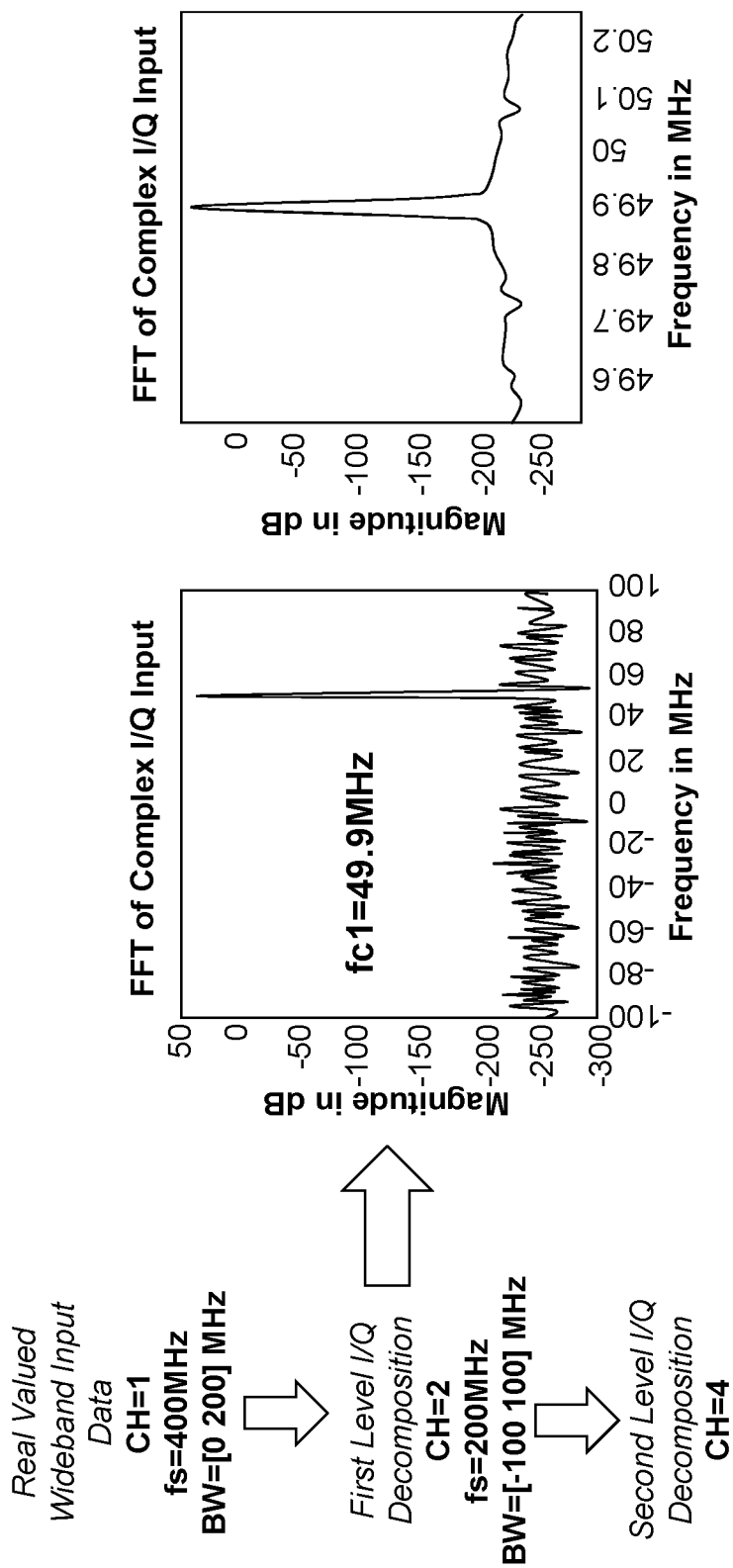
FIG. 4B is an illustration of first level I/Q decomposition in a cascaded I/Q decomposition concept of frequency translation of a single tone according to some embodiments of the present disclosure.
Figure 4C:
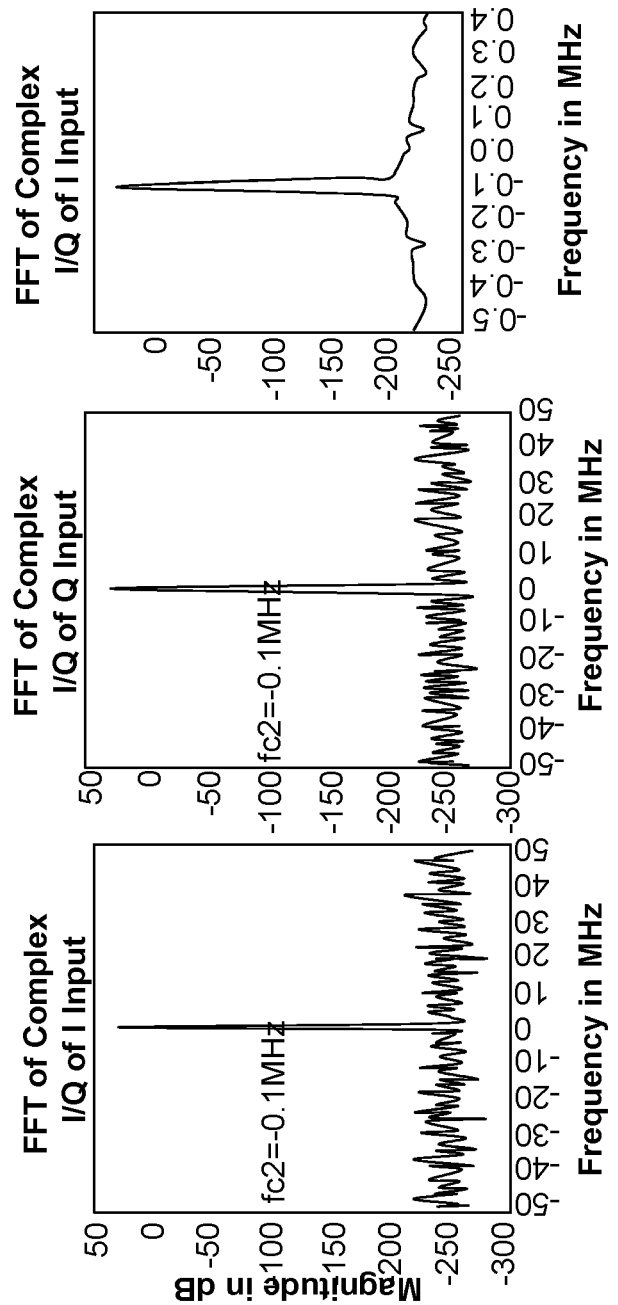
FIG. 4C is an illustration of second level I/Q decomposition in a cascaded I/Q decomposition concept of frequency translation of a single tone according to some embodiments of the present disclosure.

A MatLab simulation example showing how a single tone at 149.9 MHz will be translated to −0.1 MHz at the second decomposition level (312 in FIG. 3) is depicted in FIGS. 4A-4C. It is assumed that the original sample rate is 400 MHz, corresponding to a 200 MHz bandwidth. At the first decomposition level (310 in FIG. 3), the tone is translated to 49.9 MHz, as shown in FIG. 4B. At the second decomposition level (312 in FIG. 3), the single tone translates into four properly phase aligned tones each having resonant frequency of 0.1 MHz, as shown in FIG. 4C.

FIGS. 5A-5D illustrate all four phase alignment combinations between the four time series representing the four different frequencies in the original wideband signal. All four frequencies, I-of-I, Q-of-I, I-of-Q, and Q-of-Q, (represented by different types of lines (e.g., dashed, solid, bold) shown in FIGS. 5A-5D translate to the same baseband frequency (i.e., 0.1 MHz). However, their phase alignment uniquely identifies each original frequency in the wide band as shown in the figures.

FIGS. 6A-6D depict four coupled Ordinary Differential Equations (ODE) sets for the four four-dimensional (4D) resonators that have the same baseband resonant frequency, but represent four different resonances in the wide band. The ODEs are parameterized by the baseband resonant frequency and quality factor (Q) values. The four ODE systems have a very similar basic structure but have different sign arrangements associated with the required phase constraints between the different states. It is interesting to observe that some of the terms associated with resonator losses are positive. However, the passivity constraints are enforced via the cross-coupling terms and negative loss values in the main diagonal elements.

FIGS. 7A-7H show MatLab simulation results for the 4D resonators excited by a wideband chirp signal. Here, it is assumed a 350 MHz processor clock speed for simulating the 4D resonators and 1.4 G samples per second (Sps) sampling rate for the real valued wideband input time series. The input is a wideband chirp signal with its instantaneous frequency covering the DC-700 MHz frequency band. The overall bandwidth is 700 MHz. After the second level I/Q decomposition, the original 700 MHz bandwidth chirp signal is converted into four 175 MHz bandwidth signals sampled at 350 MHz sample rate each.

Figures 7A, 7B:
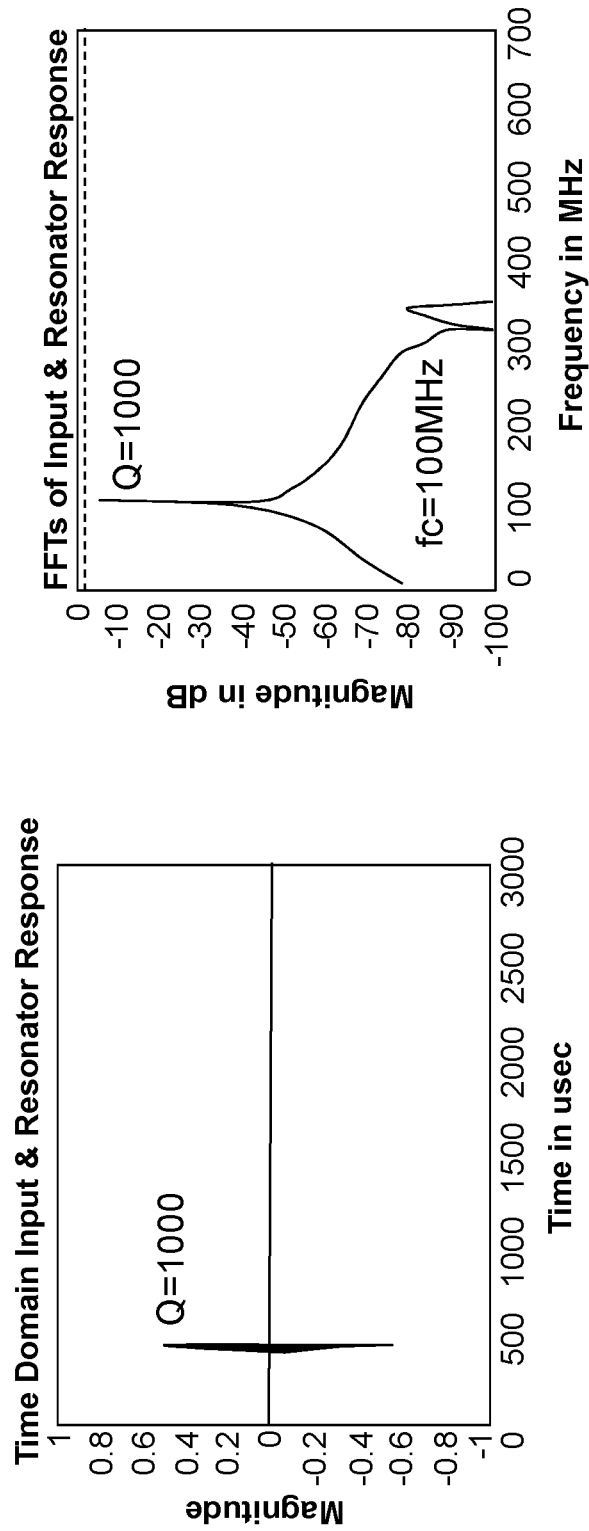
FIG. 7A is an illustration of the time domain response of a resonator that is designed to resonate at 100 megahertz (MHz) in the original band according to some embodiments of the present disclosure.
FIG. 7B is an illustration of the frequency domain response of the resonator that is designed to resonate at 100 MHz in the original band according to some embodiments of the present disclosure.

FIGS. 7A and 7B show the time domain and frequency domain responses, respectively, of the $1^{st}$ resonator that is designed to resonate at 100 MHz in the original band. The Q value is set for 1000 to make the resonant frequency clearly visible. This resonator has the state space model that is identical to the model in FIG. 6A. The simulation result shows proper wideband responses of the 4D resonator with resonant frequency equal to 100 MHz.

Figure 7D:
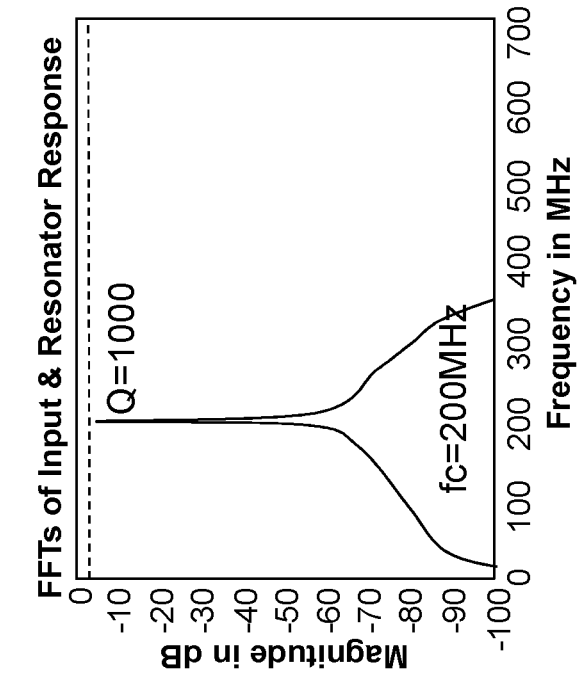
FIG. 7D is an illustration of the frequency domain response of the resonator that is designed to resonate at 200 MHz in the original band according to some embodiments of the present disclosure.
Figure 7C:
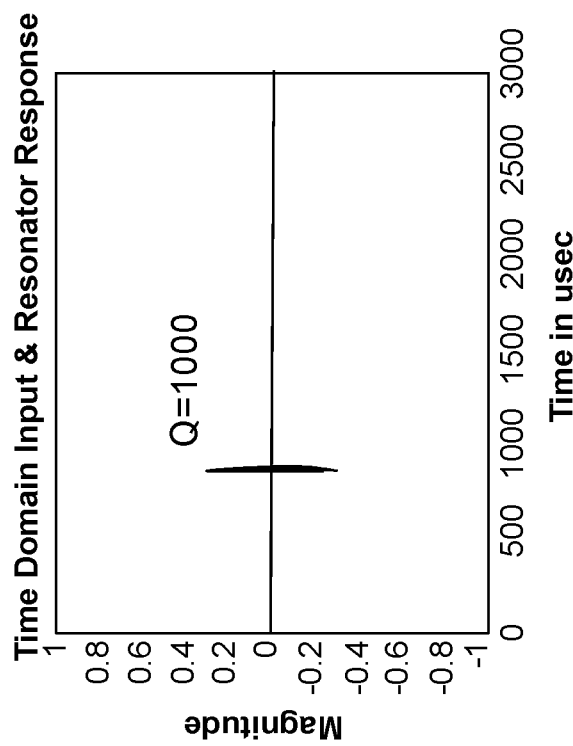
FIG. 7C is an illustration of the time domain response of a resonator that is designed to resonate at 200 MHz in the original band according to some embodiments of the present disclosure.

FIGS. 7C and 7D show the time domain and frequency domain responses, respectively, of the $2^{nd}$ resonator that is designed to resonate at 200 MHz in the original band. This resonator has the state space model that is identical to the model in FIG. 6B. The Q value is set for 1000 to make the resonant frequency clearly visible. The simulation result shows proper wideband responses of the 4D resonator with resonant frequency equal to 200 MHz.

Figure 7F:
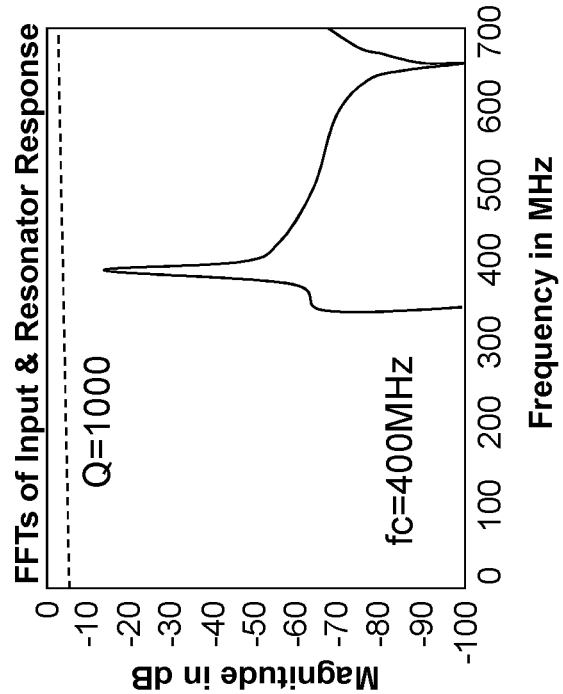
FIG. 7F is an illustration of the frequency domain response of the resonator that is designed to resonate at 400 MHz in the original band according to some embodiments of the present disclosure.
Figure 7E:
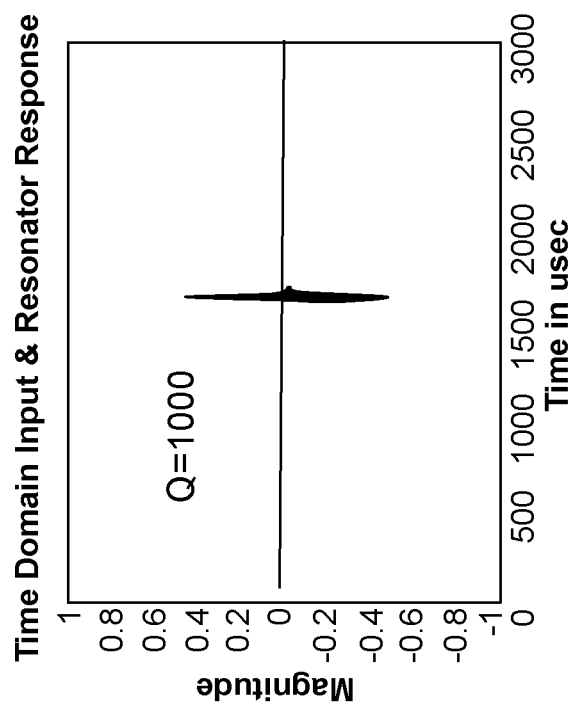
FIG. 7E is an illustration of the time domain response of a resonator that is designed to resonate at 400 MHz in the original band according to some embodiments of the present disclosure.

FIGS. 7E and 7F show the time domain and frequency domain responses, respectively, of the $3^{rd}$ resonator that is designed to resonate at 400 MHz in the original band. This resonator has the state space model that is identical to the model in FIG. 6C. The Q value is set for 1000. The simulation result shows proper wideband responses of the 4D resonator with resonant frequency equals to 400 MHz.

Figures 7G, 7H:
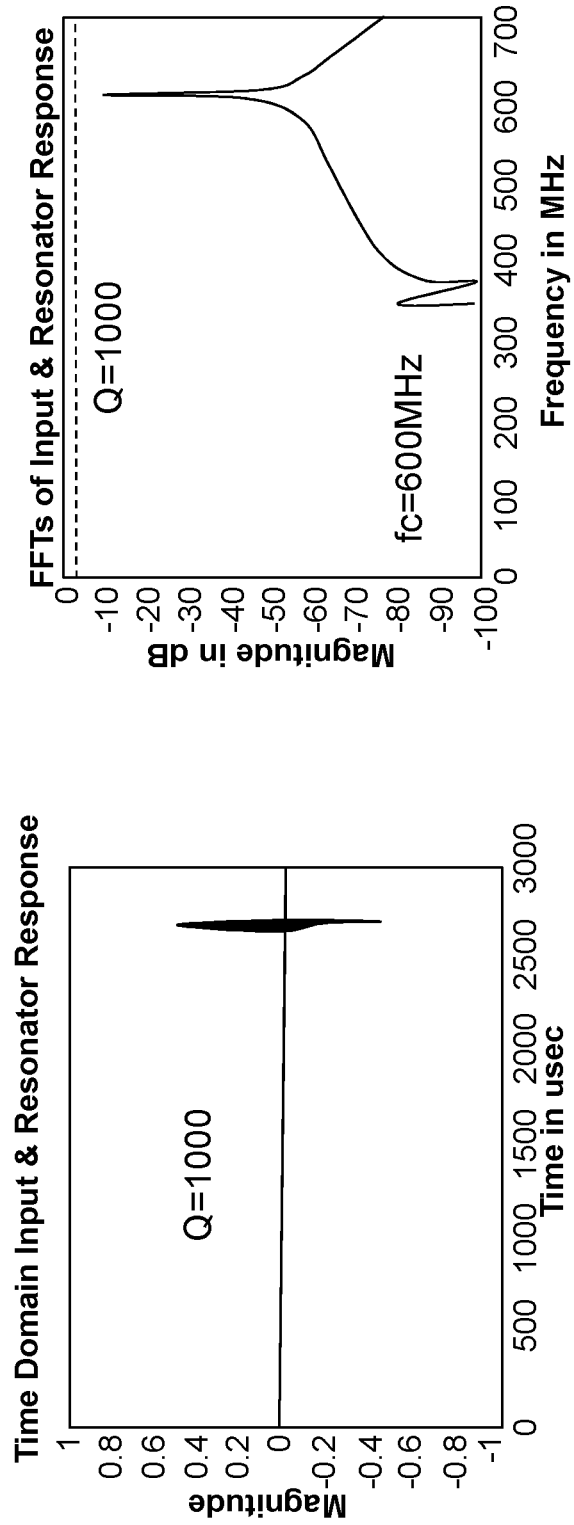
FIG. 7G is an illustration of the time domain response of a resonator that is designed to resonate at 600 MHz in the original band according to some embodiments of the present disclosure.
FIG. 7H is an illustration of the frequency domain response of the resonator that is designed to resonate at 400 MHz in the original band according to some embodiments of the present disclosure.

FIGS. 7G and 7H show the time domain and frequency domain responses, respectively, of the $4^{th}$ resonator that is designed to resonate at 600 MHz in the original band. This resonator has the state space model that is identical to the model in FIG. 6D. The Q value is set for 1000. The simulation result shows proper wideband responses of the 4D resonator with resonant frequency equals to 600 MHz. It is important to note that no parasitic resonances are visible on either the time domain or frequency domain plots. The image frequency resonances are suppressed by more than 300 dB.

FIGS. 8A-8D show MatLab simulation results for the 4D resonators excited by a wideband chirp signal. Here, the resonators have different Q values. Additionally, a 350 MHz processor clock speed is assumed for simulating the 4D resonators and 1.4 giga samples per second (GSps) sampling rate for the real valued wideband input time series. The instantaneous frequency of the chirp covers the DC-700 MHz frequency band. The overall bandwidth is 700 MHz. After the second level I/Q decomposition, the original 700 MHz bandwidth chirp signal is converted into four 175 MHz bandwidth signals sampled at 350 MHz sample rate as before.

Figure 8B:
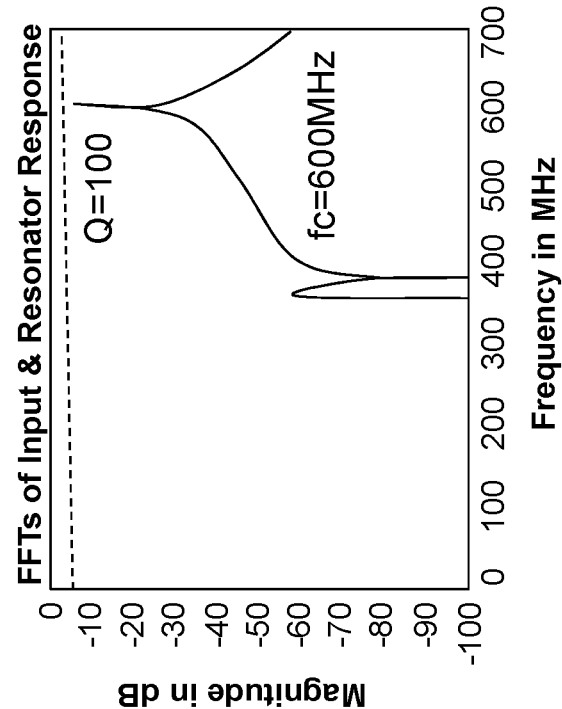
FIG. 8B is an illustration of the frequency domain response of the resonator that is designed to resonate at 600 MHz in the original band with the Q value set for 100 according to some embodiments of the present disclosure.
Figure 8A:
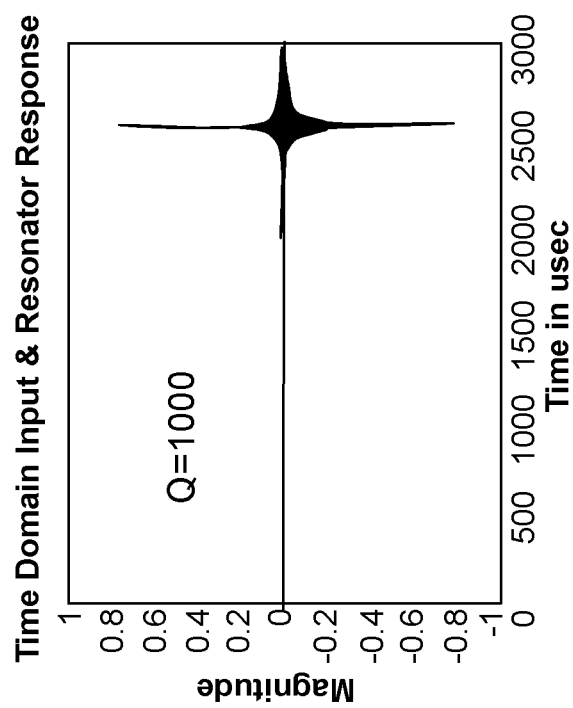
FIG. 8A is an illustration of of the time domain response of a resonator that is designed to resonate at 600 MHz in the original band with the Q value set for 100 according to some embodiments of the present disclosure.

FIGS. 8A and 8B show the time domain and frequency domain responses, respectively, of the $4^{th}$ resonator that is designed to resonate at 600 MHz in the original band. The Q value is set for 100. This resonator has the state space model that is identical to the model in FIG. 6D. The simulation result shows proper wideband responses of the 4D resonator with resonant frequency equals to 600 MHz and Q value of 100.

Figure 8D:
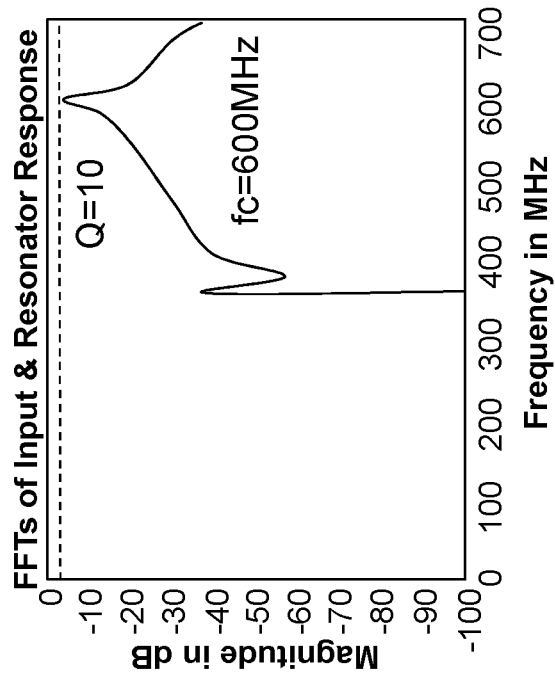
FIG. 8C is an illustration of the time domain response of a resonator that is designed to resonate at 600 MHz in the original band with the Q value set for 10 according to some embodiments of the present disclosure.
Figure 8C:
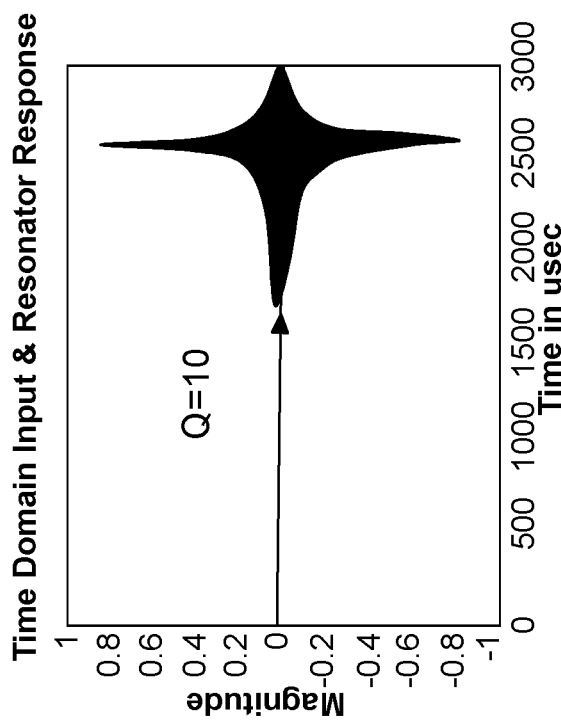

FIGS. 8C and 8D show the time domain and frequency domain responses, respectively, of the $4^{th}$ resonator that is designed to resonate at 600 MHz in the original band. However, unlike FIGS. 8A and 8B, here the Q value is set for 10. This resonator also has the state space model that is identical to the model in FIG. 6D. The simulation result shows proper wideband responses of the 4D resonator with resonant frequency equal to 600 MHz and Q value of 10. The widening of the resonance curve around the resonant frequency is clearly visible on the plots. It is important to note that no parasitic resonances are visible on either the time domain or frequency domain plots. The image frequency resonances are suppressed by more than 300 dB.

The online learning algorithm must utilize the high-dimensional state variables from the core in the online learning/adaptation process. For the ultra-wide bandwidth NeurACore architecture that can achieve >1 GHz IBW, the learning algorithm is extended to eight-dimensional state variables and weights matrices by properly cross-coupling the eight-dimensional state variables in the weights update and outputs update equations. The BSS and feature extractions algorithms are also updated to properly interpret the detected and denoised eight-dimensional state variables in order to accurately separate the unknown signal(s) from the signal mixture where all signals are represented by eight-dimensional state variables. Energy and phase maps for the real-time spectrogram are generated from the eight-dimensional state variables.

During the development of this concept, a systemic gradual approach was utilized in validating the cascaded I/Q decomposition for NeurACore by first focusing on the two-layer version for which most internal signals are four-dimensional and can achieve 2*fs IBW. The two-layer case was validated with four-dimensional state variables, gradient descent equations, and global learning layer for the output weights. The extensions of the BSS and feature extraction algorithms to the two-layer cascaded I/Q formulation were also validated. The lessons learned from the validation of the two-layer version can be incorporated into the generalized three layer and beyond cascaded I/Q algorithm formulation and implementation that will achieve >4*fs IBW.

Many commercial and military signal processing platforms require small size, ultra-wide bandwidth operation, ultra-low C-SWaP (cost, size, weight, and power) signal processing units, and artificial intelligence enhanced with real-time signal processing capability. This includes, but is not limited to radar, communication, acoustic, audio, video, and optical waveforms.

(2.2) Control of a Device

Figure 9:
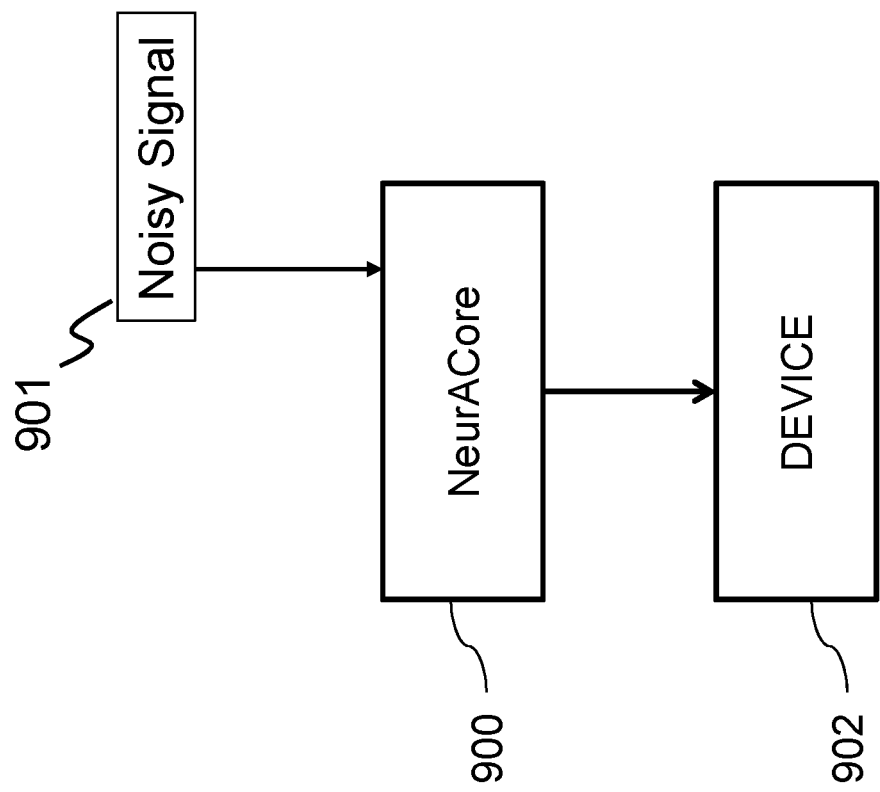
FIG. 9 is a block diagram depicting control of a device according to various embodiments.

As shown in FIG. 9, the NeurACore 900 in its hardware implementation has many applications. In one aspect, the system with the NeurACore 900 can be used for signal denoising to denoise noisy input signals 901. In some aspects, the NeurACore 900 can be used to control a device 902 based on the signal denoising (e.g., a mobile device display, a virtual reality display, an augmented reality display, a computer monitor, a motor, an autonomous vehicle, a machine, a drone, a camera, etc.). In some embodiments, the device 902 may be controlled to cause the device 902 to move or otherwise initiate a physical action based on the denoised signal.

In some embodiments, a drone or other autonomous vehicle may be controlled to move to an area where an object is determined to be based on the imagery. In yet some other embodiments, a camera may be controlled to orient towards the identified object. In other words, actuators or motors are activated to cause the camera (or sensor) to move or zoom in on the location where the object is localized. In yet another aspect, if a system is seeking a particular object and if the object is not determined to be within the field-of-view of the camera, the camera can be caused to rotate or turn to view other areas within a scene until the sought-after object is detected.

In addition, in a non-limiting example of an autonomous vehicle having multiple sensors, such as cameras, which might include noisy signals that need denoising. The system can denoise the signal and then, based on the signal, cause the autonomous vehicle to perform a vehicle operation. For instance, if two vehicle sensors detect the same object, object detection and classification accuracy is increased and the system described herein can cause a precise vehicle maneuver for collision avoidance by controlling a vehicle component. For example, if the object is a stop sign, the system may denoise a noisy input signal to identify the stop sign and then may cause the autonomous vehicle to apply a functional response, such as a braking operation, to stop the vehicle. Other appropriate responses may include one or more of a steering operation, a throttle operation to increase speed or to decrease speed, or a decision to maintain course and speed without change. The responses may be appropriate for avoiding a collision, improving travel speed, or improving efficiency. Non-limiting examples of devices that can be controlled via the NeurACore include a vehicle or a vehicle component, such as a brake, a steering mechanism, suspension, or safety device (e.g., airbags, seatbelt tensioners, etc.). Further, the vehicle could be an unmanned aerial vehicle (UAV), an autonomous ground vehicle, or a human operated vehicle controlled either by a driver or by a remote operator. As can be appreciated by one skilled in the art, control of other device types is also possible.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A Neuromorphic Adaptive Core (NeurACore) signal processor for ultra-wide instantaneous bandwidth denoising of a noisy signal, comprising:
   a digital signal pre-processing unit, the digital signal pre-processing unit being operable for performing cascaded decomposition of a wideband complex valued In-phase and Quadrature-phase (I/Q) input signal in real time,
   wherein the wideband complex valued I/Q input signal is decomposed into I and Q sub-channels;
   a NeurACore and local learning layers, the NeurACore and local learning layers operable for performing high-dimensional projection of the wideband complex valued I/Q input signal into a high-dimensional state space;
   a global learning layer, the global learning layer operable for performing a gradient descent online learning algorithm; and
   a neural combiner, the neural combiner operable for combining outputs of the global learning layer to compute signal predictions corresponding to the wideband complex valued I/Q input signal.

2. The NeurACore signal processor as set forth in claim 1, wherein the cascaded decomposition is a multi-layered I/Q decomposition scheme, wherein for each layer, a sample rate of the layer is reduced by half compared to a preceding layer in the cascaded decomposition.

3. The NeurACore signal processor as set forth in claim 2, wherein the cascaded decomposition is a three layer I/Q decomposition scheme, and wherein the gradient descent online learning algorithm is an eight-dimensional gradient descent online learning algorithm.

4. The NeurACore signal processor as set forth in claim 3, wherein the gradient descent online learning algorithm uses eight-dimensional state variables and weight matrices by cross coupling the eight-dimensional state variables in weights update equations and output layer update equations.

5. The NeurACore signal processor as set forth in claim 4, wherein the digital signal pre-processing is further operable for implementing blind source separation (BSS) and feature extraction algorithms with updates to interpret denoised eight-dimensional state variables.

6. The NeurACore signal processor as set forth in claim 1, wherein the NeurACore comprises high-dimensional signal processing nodes with adaptable parameters.

7. A computer program product comprising a non-transitory computer-readable medium having computer-readable instructions stored thereon, wherein the computer-readable instructions are executable by a computer having one or more processors for causing the one or more processors to perform operations of:
   performing cascaded decomposition of a wideband complex valued In-phase and Quadrature-phase (I/Q) input signal in real time into I and Q sub-channels;
   performing high-dimensional projection of the wideband complex valued I/Q input signal into a high-dimensional state space;
   performing a gradient descent online learning algorithm; and
   combining outputs of the global learning layer to compute signal predictions corresponding to the wideband complex valued I/Q input signal.

8. The computer program product as set forth in claim 7, wherein the cascaded decomposition is a multi-layered I/Q decomposition scheme, wherein for each layer, a sample rate of the layer is reduced by half compared to a preceding layer in the cascaded decomposition.

9. The computer program product as set forth in claim 8, wherein the cascaded decomposition is a three layer I/Q decomposition scheme, and wherein the gradient descent online learning algorithm is an eight-dimensional gradient descent online learning algorithm.

10. The computer program product as set forth in claim 9, wherein the gradient descent online learning algorithm uses eight-dimensional state variables and weight matrices by cross coupling the eight-dimensional state variables in weights update equations and output layer update equations.

11. The computer program product as set forth in claim 10, wherein blind source separation (BSS) and feature extraction algorithms are implemented with updates to interpret denoised eight-dimensional state variables.

12. A computer implemented method for ultra-wide instantaneous bandwidth denoising of a noisy signal, the method comprising an act of:
   causing one or more processors to execute instructions encoded on a non-transitory computer-readable medium, such that upon execution, the one or more processors perform operations of:
      performing cascaded decomposition of a wideband complex valued In-phase and Quadrature-phase (I/Q) input signal in real time into I and Q sub-channels;

performing high-dimensional projection of the wideband complex valued I/Q input signal into a high-dimensional state space;

performing a gradient descent online learning algorithm; and combining outputs of the global learning layer to compute signal predictions corresponding to the wideband complex valued I/Q input signal.

13. The method as set forth in claim 12, wherein the cascaded decomposition is a multi-layered I/Q decomposition scheme, wherein for each layer, a sample rate of the layer is reduced by half compared to a preceding layer in the cascaded decomposition.

14. The method as set forth in claim 13, wherein the cascaded decomposition is a three layer I/Q decomposition scheme, and wherein the gradient descent online learning algorithm is an eight-dimensional gradient descent online learning algorithm.

15. The method as set forth in claim 14, wherein the gradient descent online learning algorithm uses eight-dimensional state variables and weight matrices by cross coupling the eight-dimensional state variables in weights update equations and output layer update equations.

16. The method as set forth in claim 15, wherein the digital signal pre-processing is further operable for implementing blind source separation (BSS) and feature extraction algorithms with updates to interpret denoised eight-dimensional state variables.

* * * * *